United States Patent
Lee et al.

(10) Patent No.: US 11,019,604 B2
(45) Date of Patent: May 25, 2021

(54) METHOD FOR TRANSMITTING AND RECEIVING UPLINK DATA IN WIRELESS COMMUNICATION SYSTEM AND DEVICE FOR SAME

(71) Applicant: LG ELECTRONICS INC., Seoul (KR)

(72) Inventors: Eunjong Lee, Seoul (KR); Heejeong Cho, Seoul (KR); Genebeck Hahn, Seoul (KR); Kitae Kim, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/691,246

(22) Filed: Nov. 21, 2019

(65) Prior Publication Data

US 2020/0092853 A1    Mar. 19, 2020

Related U.S. Application Data

(63) Continuation of application No. 15/741,499, filed as application No. PCT/KR2015/013067 on Dec. 2, 2015, now Pat. No. 10,492,174.

(Continued)

(51) Int. Cl.
*H04W 72/04* (2009.01)
*H04L 1/00* (2006.01)
(Continued)

(52) U.S. Cl.
CPC .......... *H04W 72/04* (2013.01); *H04L 1/0061* (2013.01); *H04L 1/08* (2013.01); *H04L 1/18* (2013.01);
(Continued)

(58) Field of Classification Search
CPC ............. H04W 72/0413; H04W 72/14; H04W 72/042; H04W 72/04; H04L 1/1862;
(Continued)

(56) References Cited

U.S. PATENT DOCUMENTS 10,492,174 B2    11/2019 Lee et al.
2010/0074231 A1    3/2010 Hsu
(Continued)

FOREIGN PATENT DOCUMENTS

JP    2008092378    4/2008
JP    2012516607    7/2012
(Continued)

OTHER PUBLICATIONS

U.S. Appl. No. 15/741,499, Office Action dated Apr. 4, 2019, 16 pages.
(Continued)

*Primary Examiner* — Brian D Nguyen
(74) *Attorney, Agent, or Firm* — Lee Hong Degerman Kang Waimey

(57) ABSTRACT

The present description provides a method for transmitting and receiving uplink (UL) data in a wireless communication system. A method, which is carried out by means of a terminal, comprises the steps of: receiving a first uplink grant from a base station; transmitting, on the basis of the first uplink grant, first uplink data to the base station; receiving an HARQ response to the first uplink data from the base station; transmitting second uplink data to the base station by means of retransmission resources allocated for the retransmission of the first uplink data; and transmitting, to the base station, control information which indicates whether the second uplink data is retransmission data of the first uplink data or new data generated by means of a particular event.

19 Claims, 31 Drawing Sheets

Related U.S. Application Data

(60) Provisional application No. 62/187,827, filed on Jul. 2, 2015.

(51) Int. Cl.
*H04L 1/08* (2006.01)
*H04L 1/18* (2006.01)
*H04L 5/00* (2006.01)
*H04W 72/14* (2009.01)

(52) U.S. Cl.
CPC .............. *H04L 1/1861* (2013.01); *H04L 5/00* (2013.01); *H04W 72/042* (2013.01); *H04W 72/0413* (2013.01); *H04W 72/14* (2013.01)

(58) Field of Classification Search
CPC . H04L 1/0061; H04L 1/08; H04L 5/00; H04L 1/18
See application file for complete search history.

(56) References Cited

U.S. PATENT DOCUMENTS

| | | | |
|---|---|---|---|
| 2010/0235705 A1 | 9/2010 | Kim et al. | |
| 2012/0033606 A1 | 2/2012 | Chun et al. | |
| 2012/0243497 A1 | 9/2012 | Chung et al. | |
| 2013/0266001 A1 | 10/2013 | Peisa et al. | |
| 2014/0086152 A1 | 3/2014 | Bontu et al. | |
| 2014/0269605 A1* | 9/2014 | Pecen | H04W 74/0858 370/330 |
| 2014/0307672 A1* | 10/2014 | Papasakellariou | H04W 72/0453 370/329 |
| 2015/0327288 A1 | 11/2015 | Park | |
| 2015/0365198 A1 | 12/2015 | Tabet et al. | |
| 2016/0143030 A1* | 5/2016 | Lee | H04L 5/0053 370/329 |
| 2016/0183276 A1 | 6/2016 | Marinier et al. | |
| 2016/0192366 A1 | 6/2016 | Mizusawa | |
| 2016/0205704 A1 | 7/2016 | Aiba et al. | |
| 2016/0294531 A1* | 10/2016 | Loehr | H04W 72/042 |
| 2018/0131473 A1 | 5/2018 | Moon et al. | |
| 2018/0192398 A1 | 7/2018 | Lee et al. | |
| 2018/0278377 A1* | 9/2018 | Bae | H04L 1/1812 |
| 2020/0235870 A1* | 7/2020 | Kim | H04L 5/0055 |
| 2020/0260477 A1* | 8/2020 | Kim | H04L 5/001 |

FOREIGN PATENT DOCUMENTS

| | | |
|---|---|---|
| WO | 2013082785 | 6/2013 |
| WO | 2014138843 | 9/2014 |
| WO | 2014146736 | 9/2014 |

OTHER PUBLICATIONS

PCT International Application No. PCT/KR2015/013067, Written Opinion of the International Searching Authority dated Apr. 1, 2016, 18 pages.
PCT International Application No. PCT/KR2015/013069, International Search Report dated Apr. 1, 2016, 3 pages.
European Patent Office Application Serial No. 15897265.3, Search Report dated Nov. 28, 2018, 9 pages.
Ericsson, "Discussion on UL HARQ handling in LAA", 3GPP TSG RAN WG1 Ad-hoc Meeting, R1-151139, XP050951464, Mar. 2015, 2 pages.
Nokia, et al., "NDI Handling", 3GPP TSG RAN WG2 Meeting #54bis, R1-083729, XP050317068, Oct. 2008, 2 pages.
ETSI, "LTE; Evolved Universal Terrestrial Radio Access (E-UTRA); Physical layer procedures (3GPP TS 36.213 version 12.4.0 Release 12)", ETSI TS 136 213 V124.0, XP055310306, Feb. 2015, 227 pages.
Japan Patent Office Application No. 2017-568175, Office Action dated Feb. 5, 2019, 2 pages.
State Intellectual Property Office of the People's Republic of China Serial No. 201580082471.4, Office Action dated Apr. 23, 2020, 18 pages.
U.S. Appl. No. 15/736,733, Office Action dated Jun. 10, 2019, 24 pages.

* cited by examiner

[Figure 1]
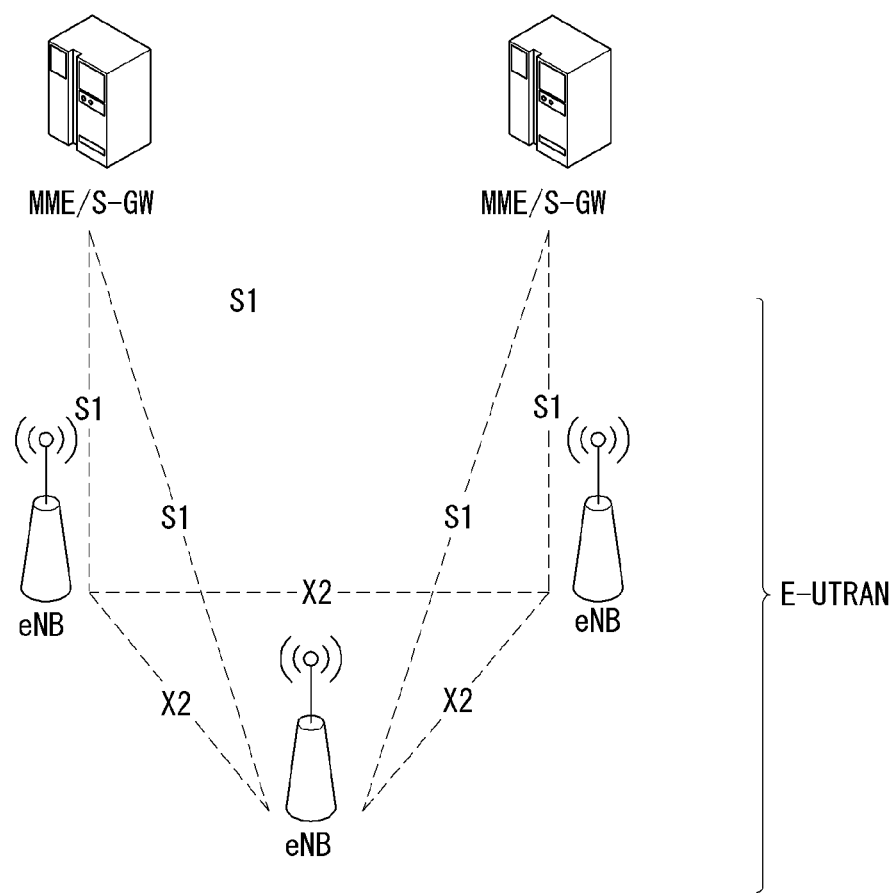

[Figure 2]
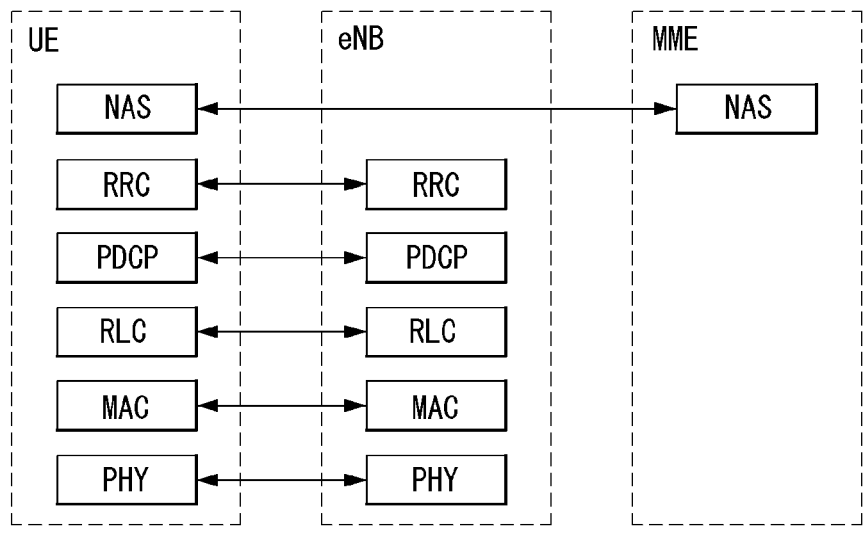
(a) Control plane protocol stack
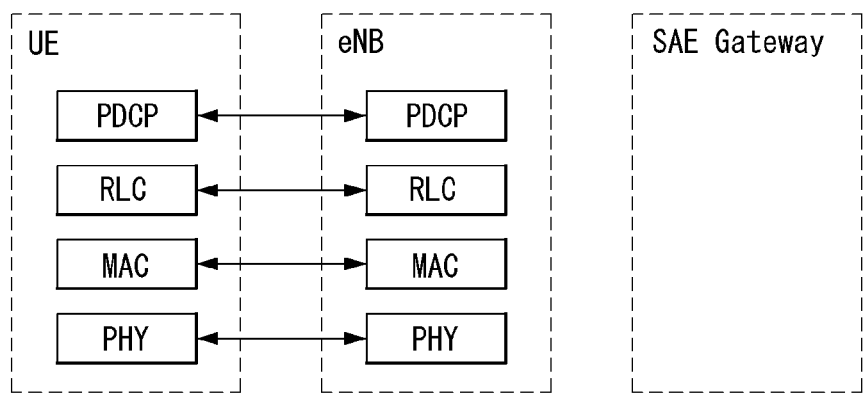
(b) Control plane protocol stack 【Figure 3】
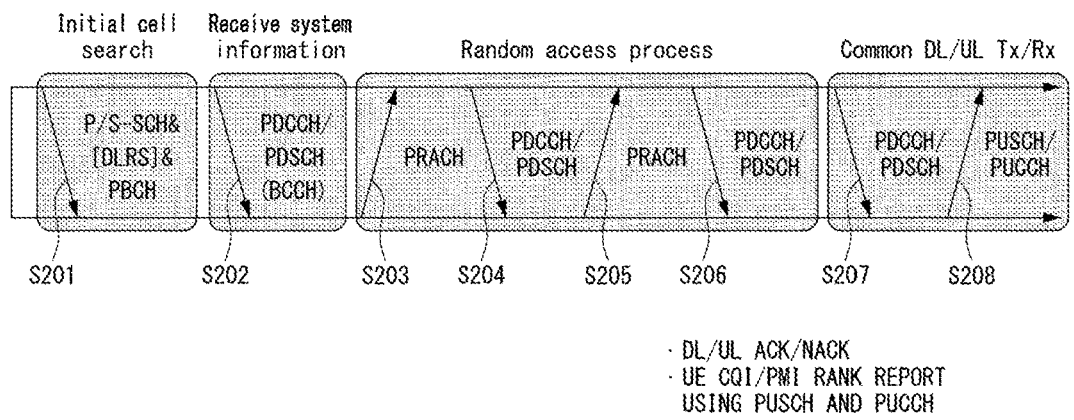

【Figure 4】
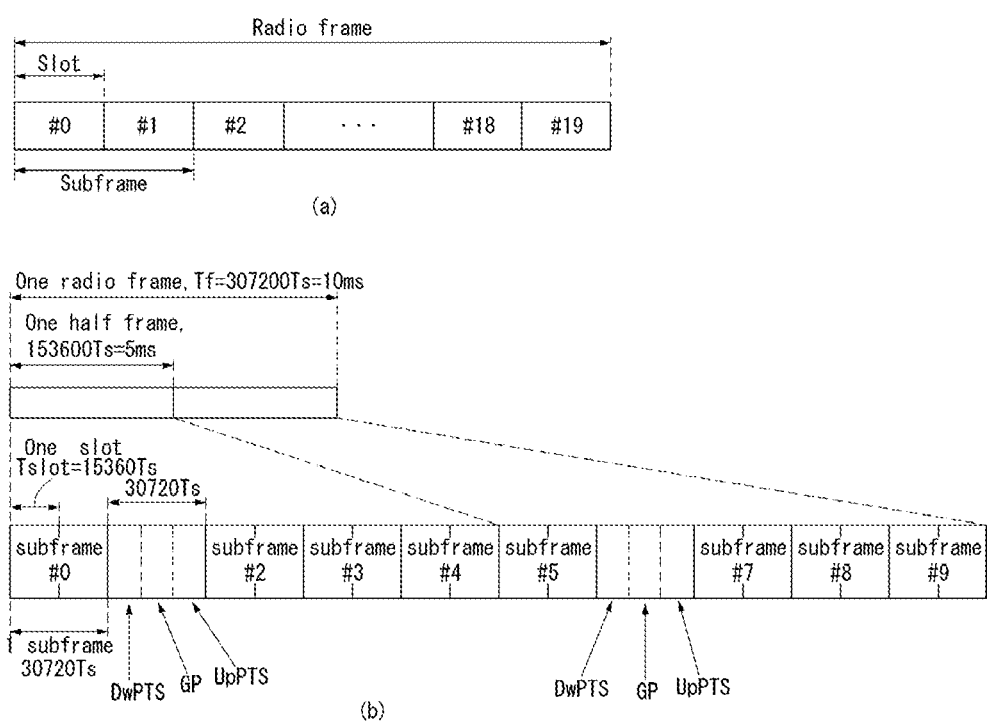

[Figure 5]
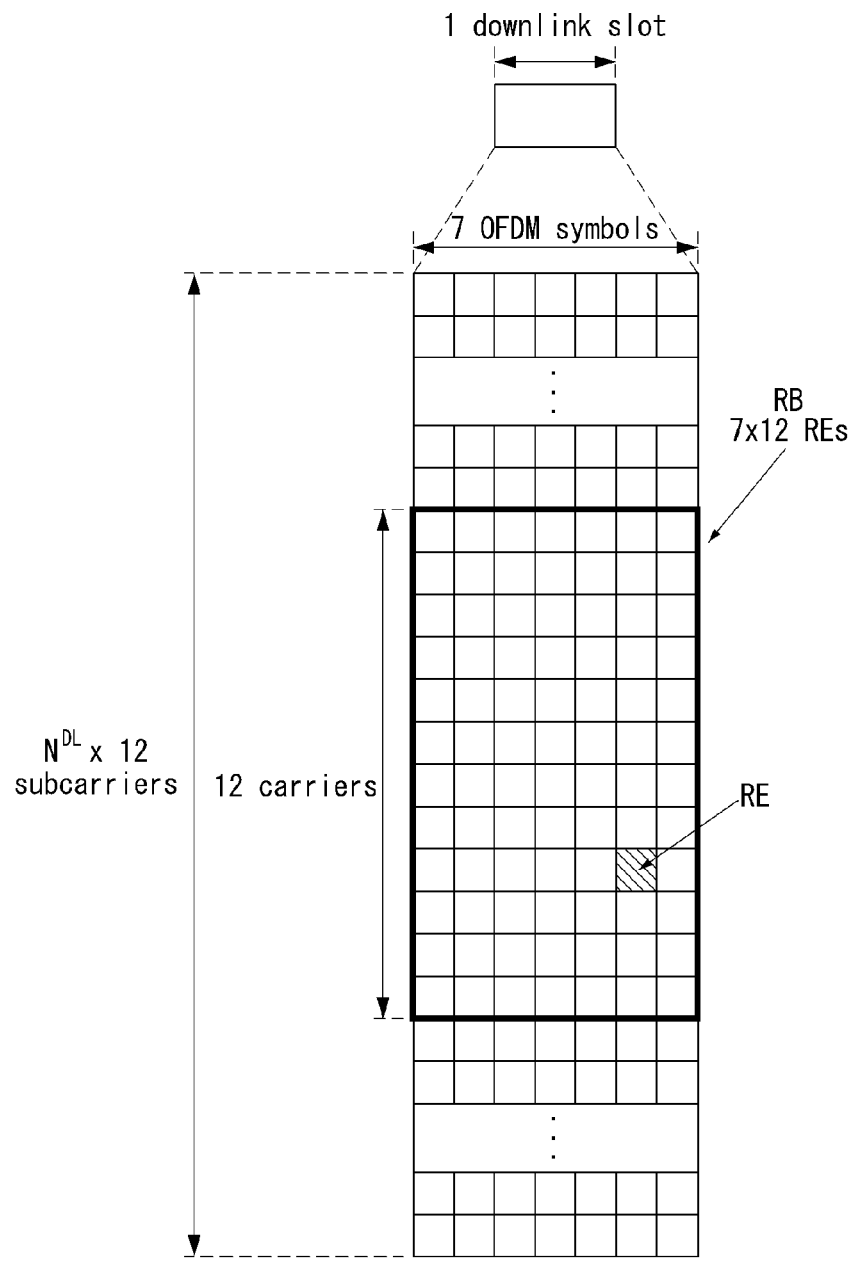

【Figure 6】
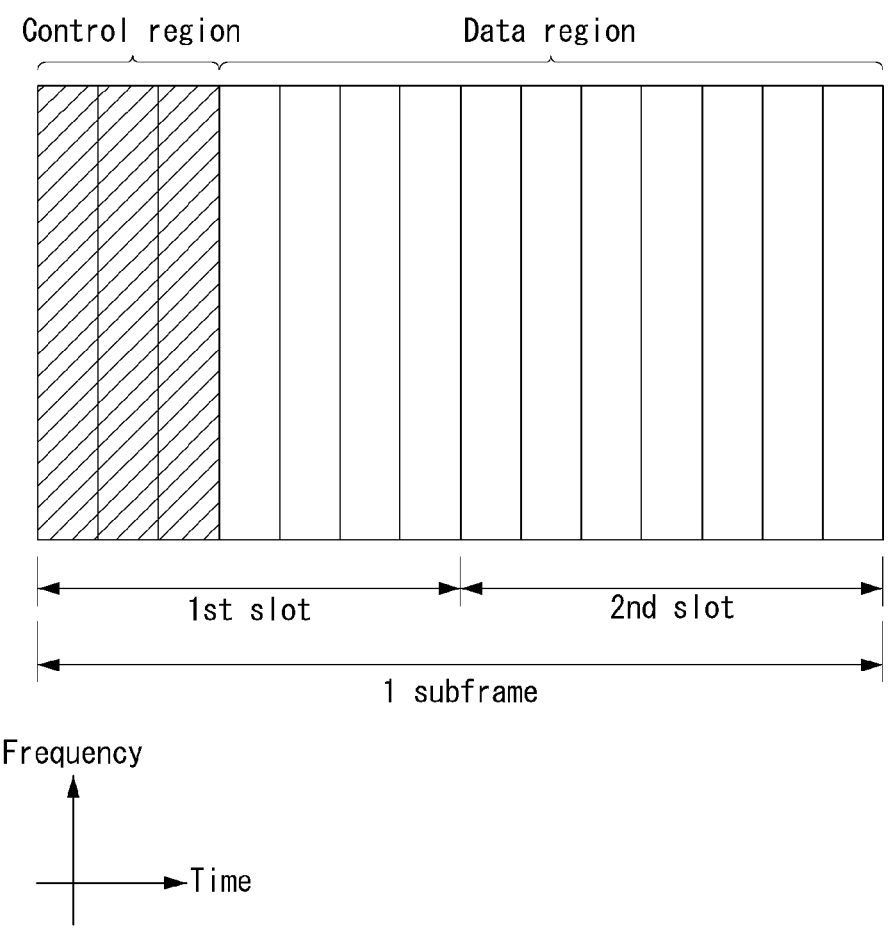

[Figure 7]
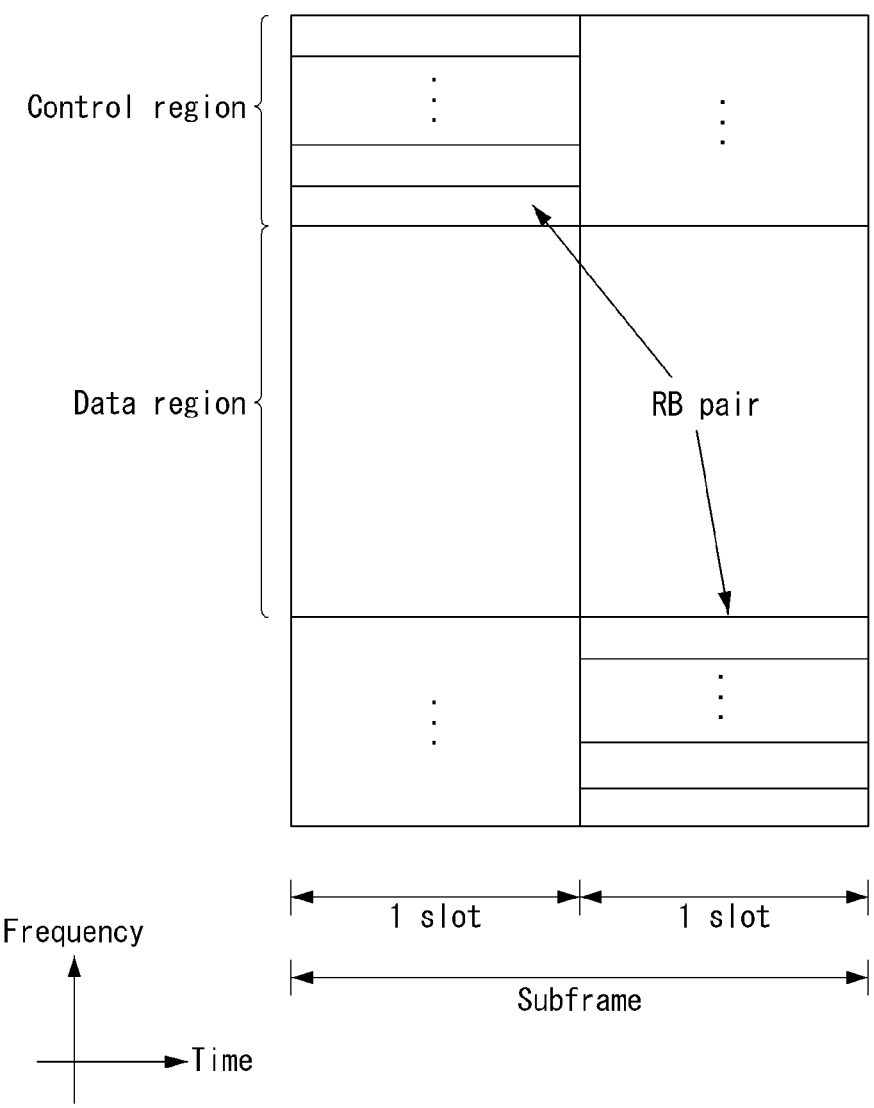

【Figure 8】
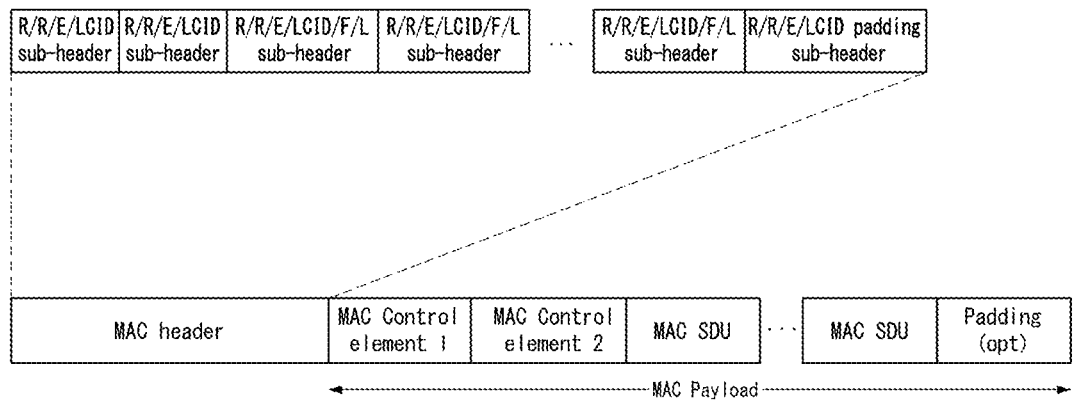
【Figure 9】
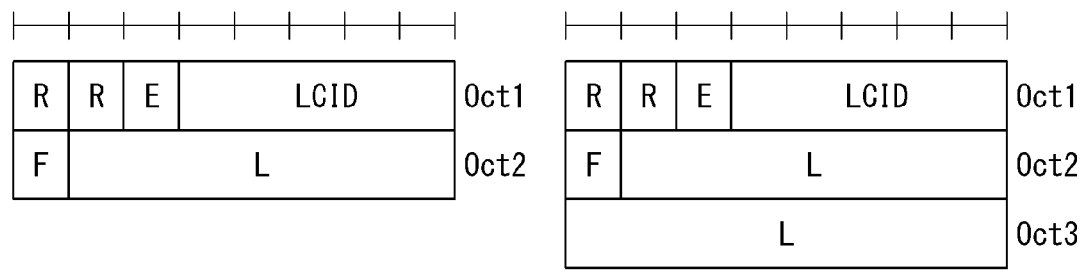
(a) R/R/E/LCID/F/L sub-header with 7-bit Lfield
(b) R/R/E/LCID/F/L sub-header with 15-bit Lfield
【Figure 10】
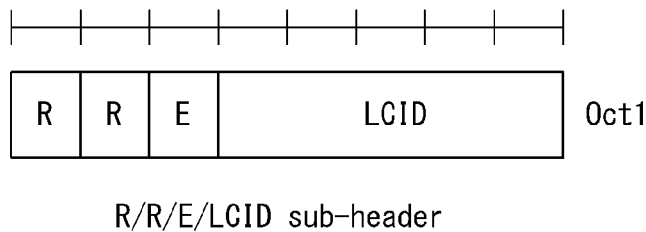
R/R/E/LCID sub-header 【Figure 11】
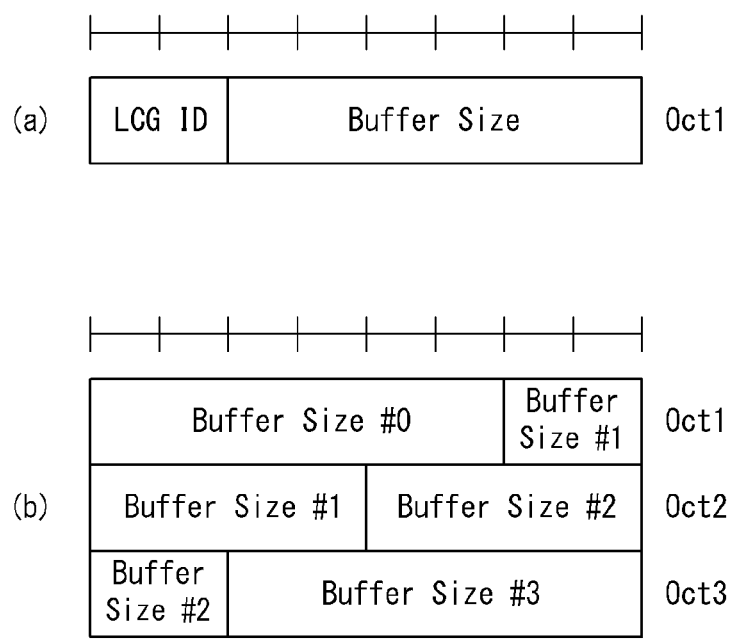

【Figure 12】
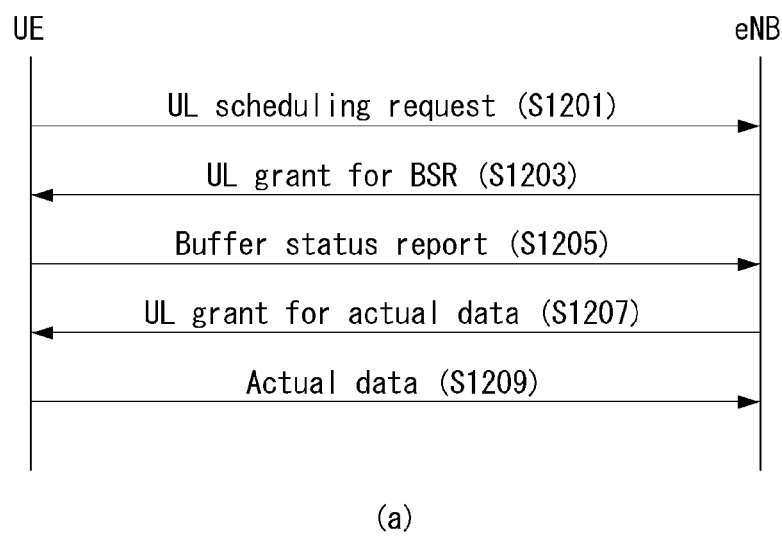
(a)
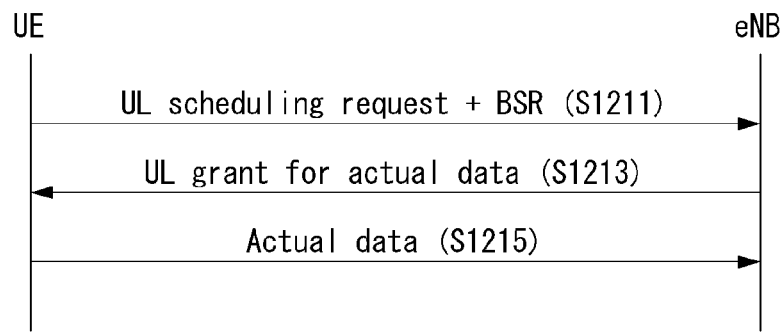
(b)

【Figure 13】
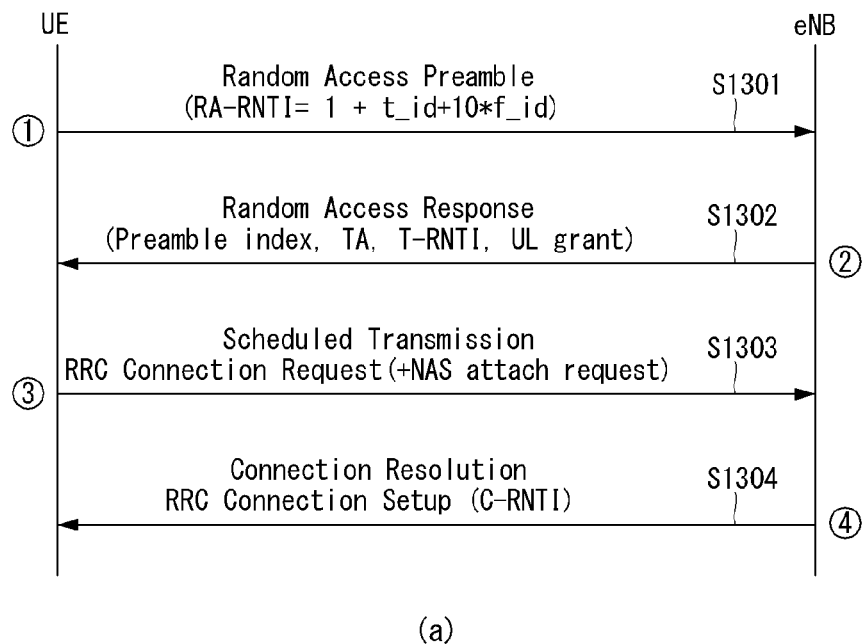
(a)
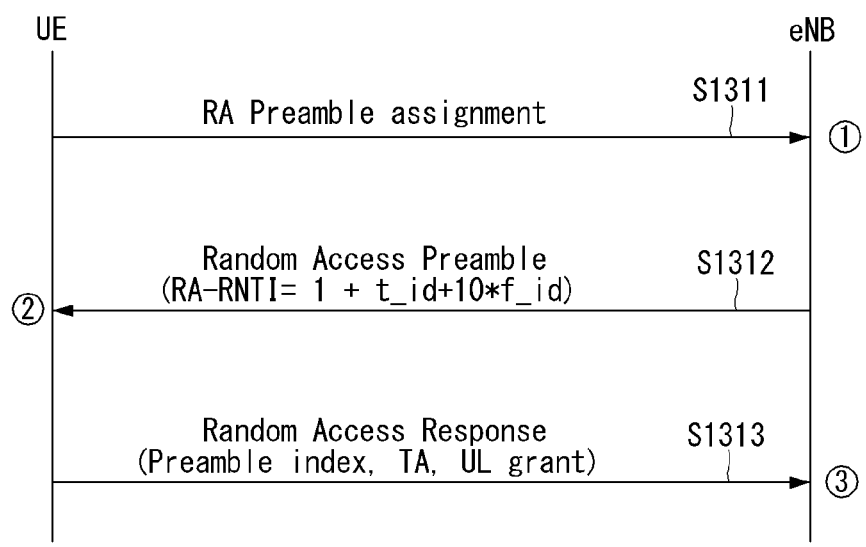
(b)

【Figure 14】
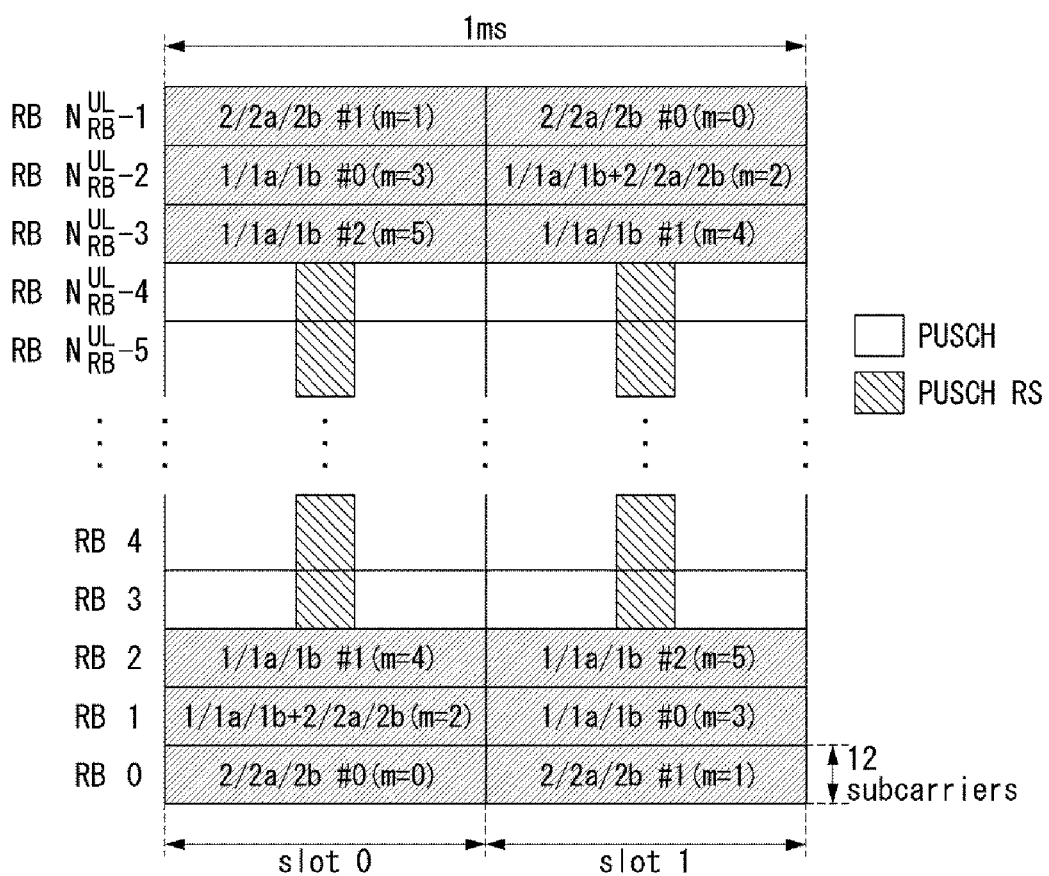

【Figure 15】
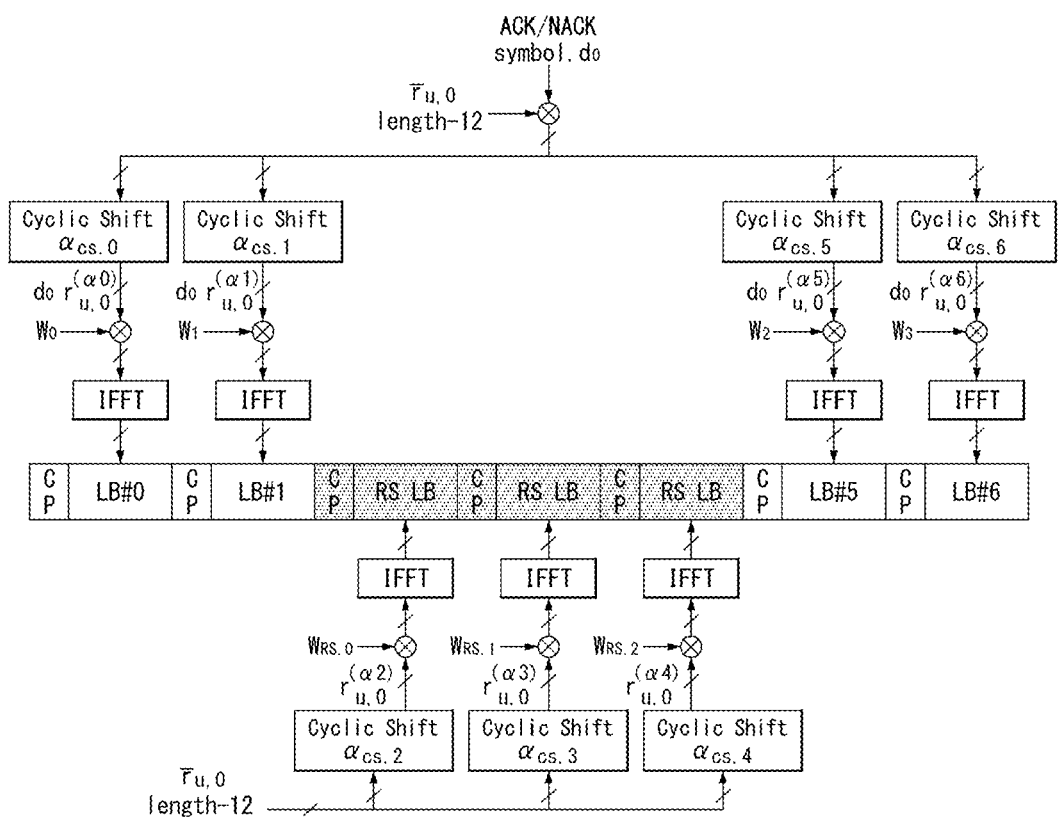

【Figure 16】
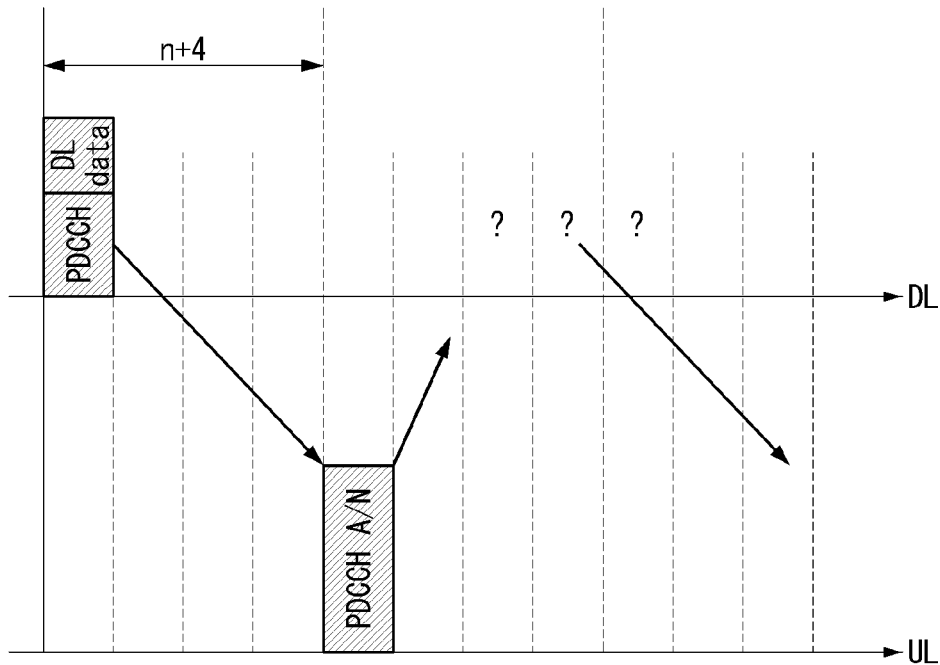
【Figure 17】
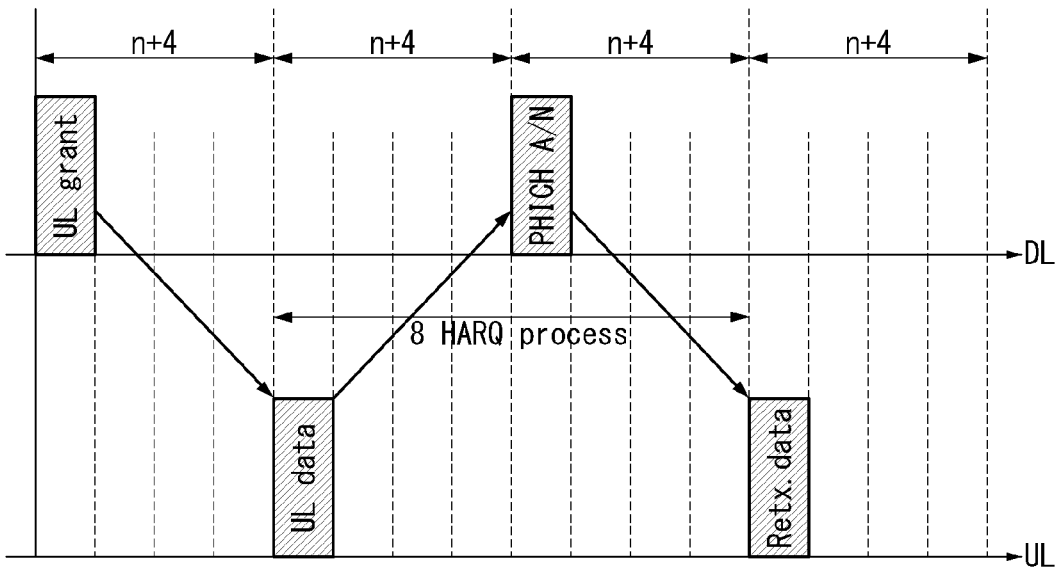

【Figure 18】
| 0/1A | FH | Resource block assignment | MCS/RV(5) | NDI | TPC (2) | DMRS CS(3) | UI (2) | DAI (2) | CQI req. |
【Figure 19】
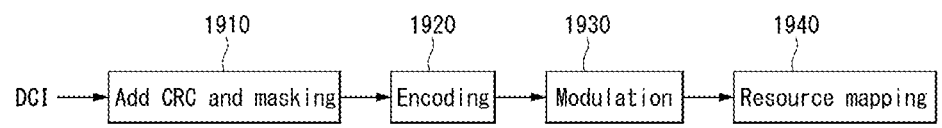

【Figure 20】
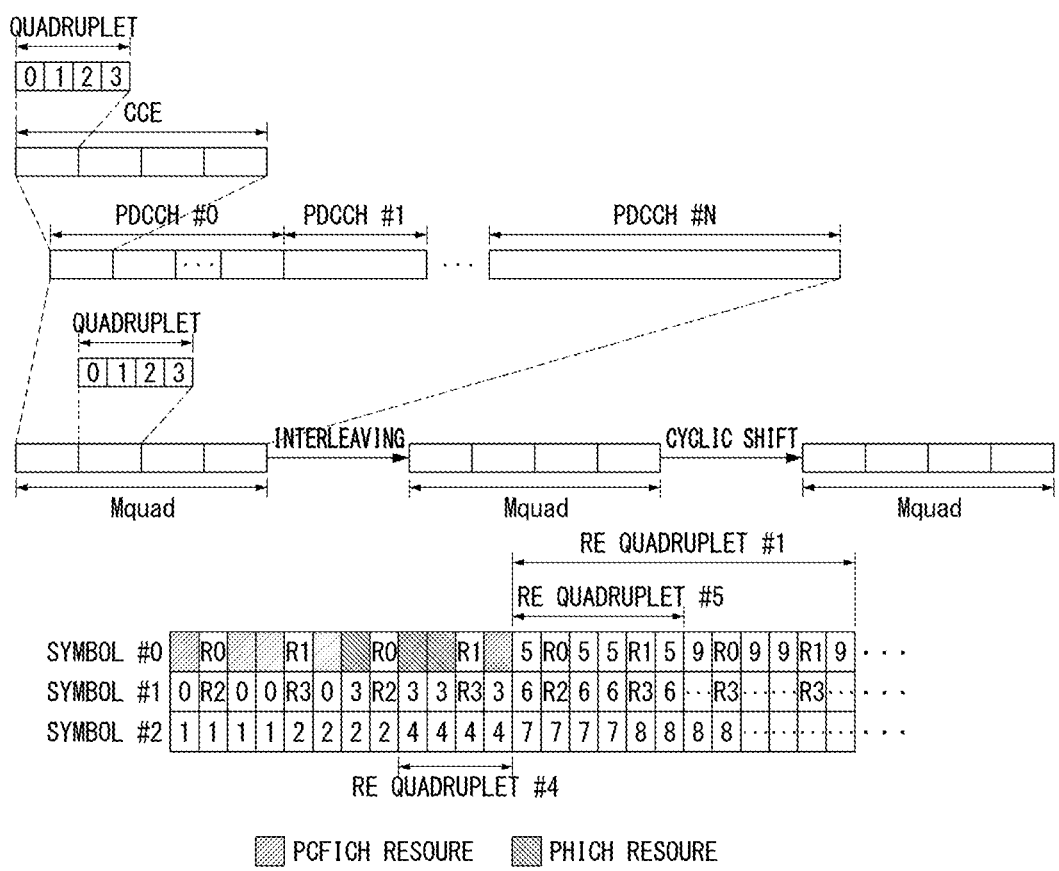

【Figure 21】
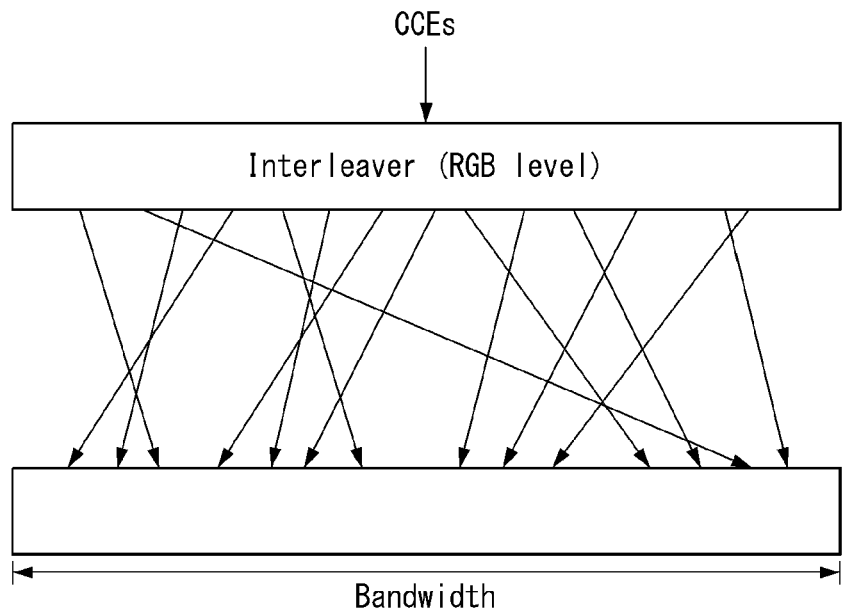
【Figure 22】
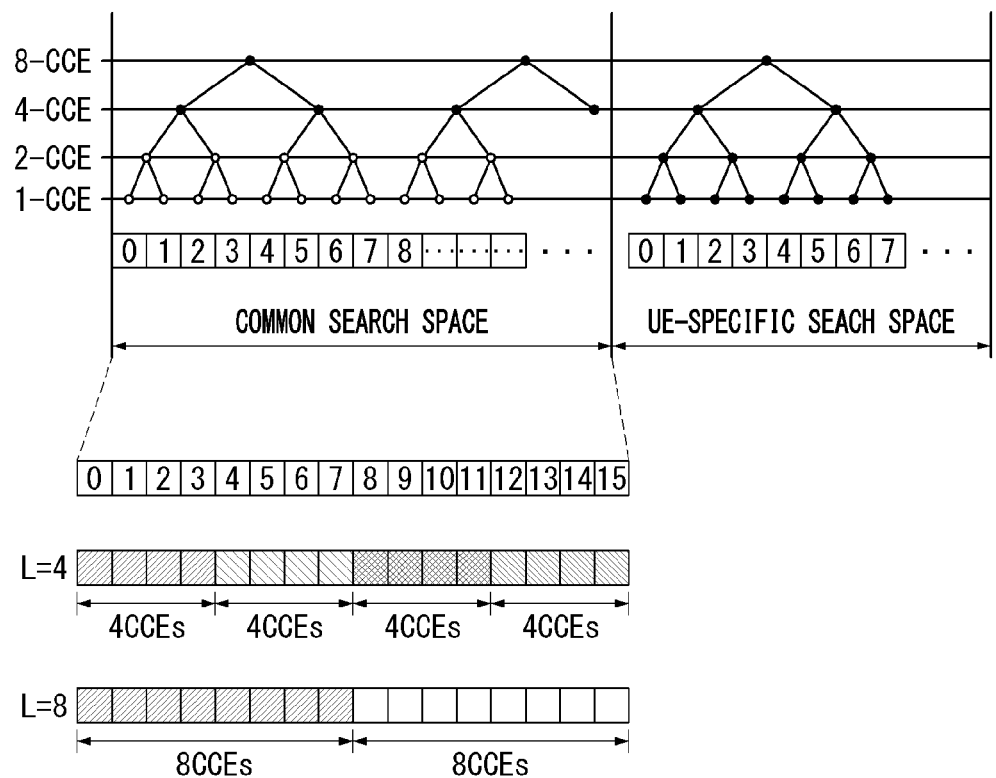

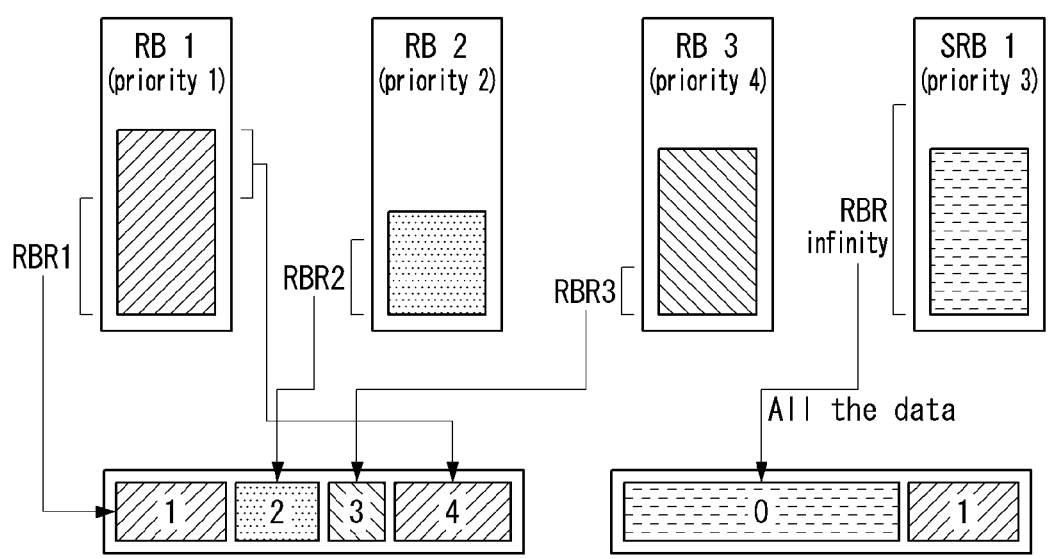
[Figure 23]

[Figure 24]
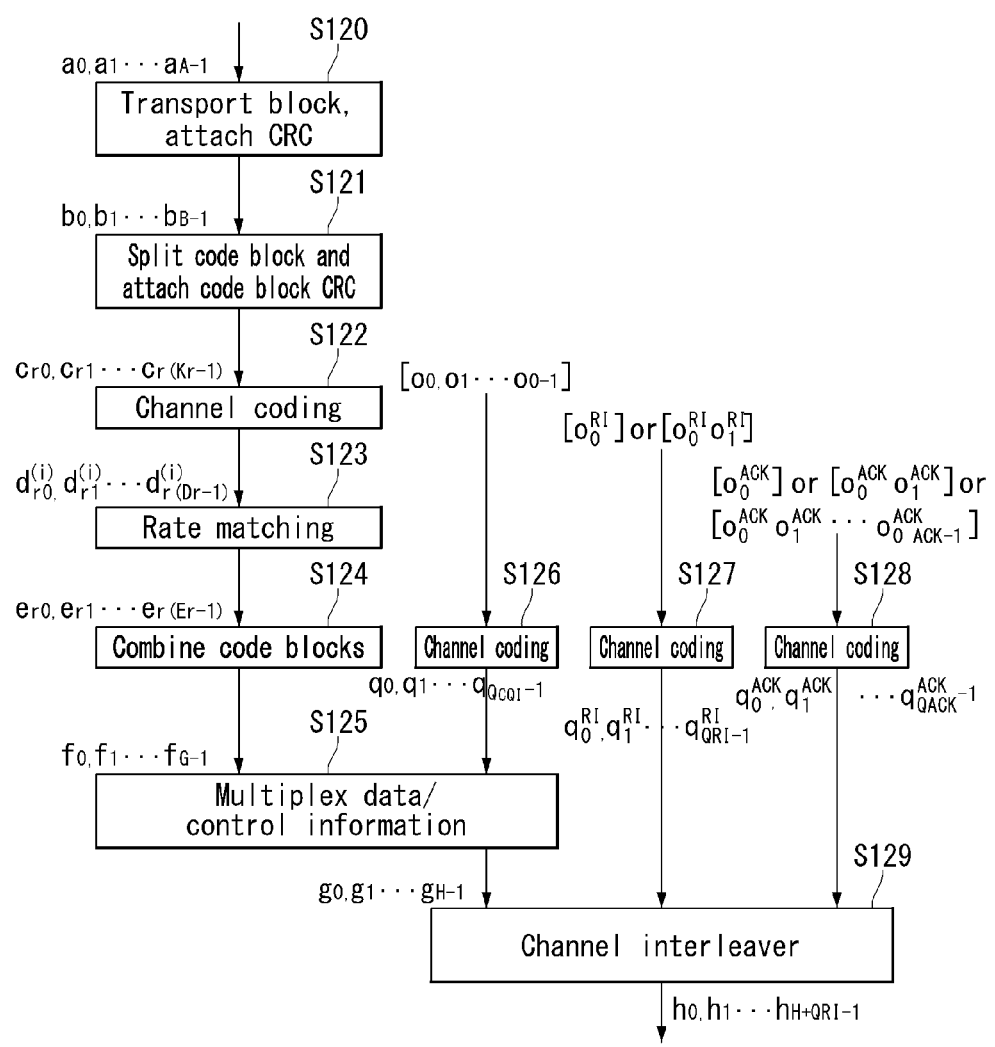

[Figure 25]
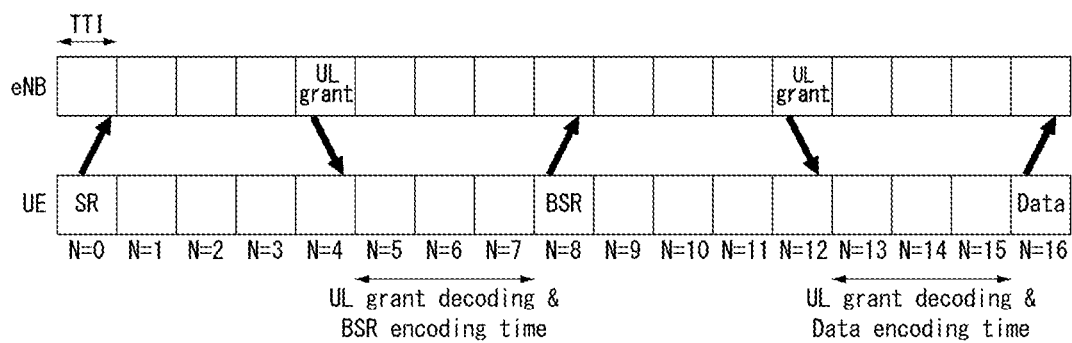

【Figure 26】
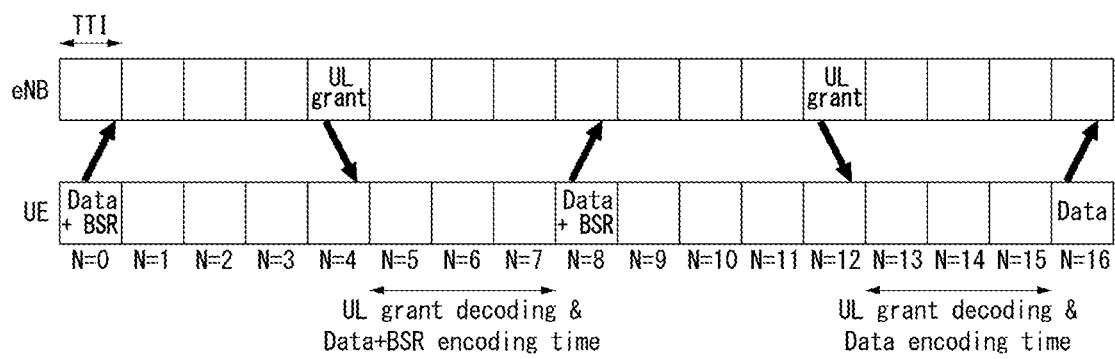

【Figure 27】
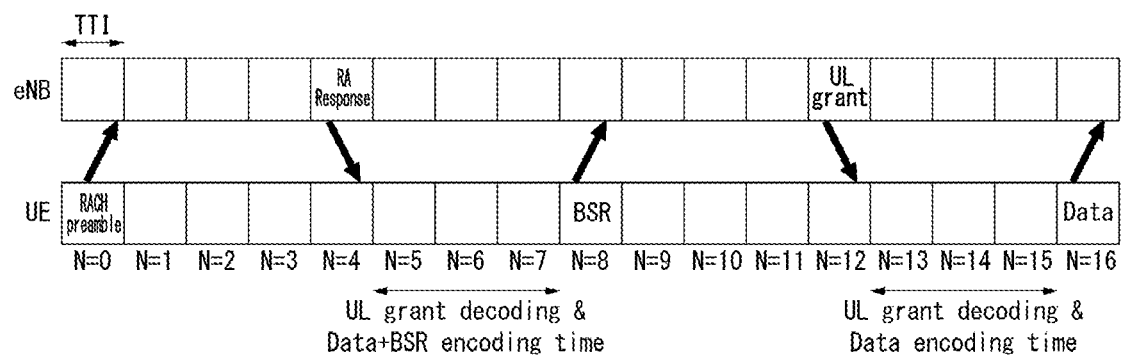

【Figure 28】
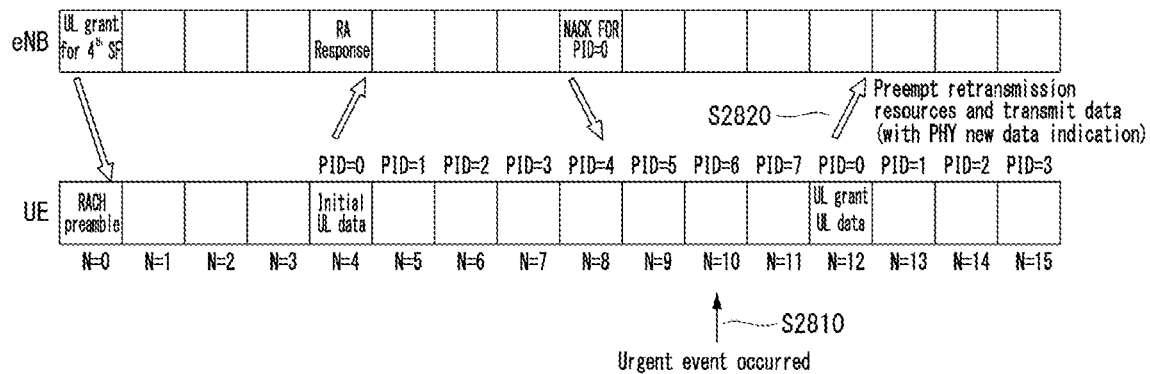

【Figure 29】
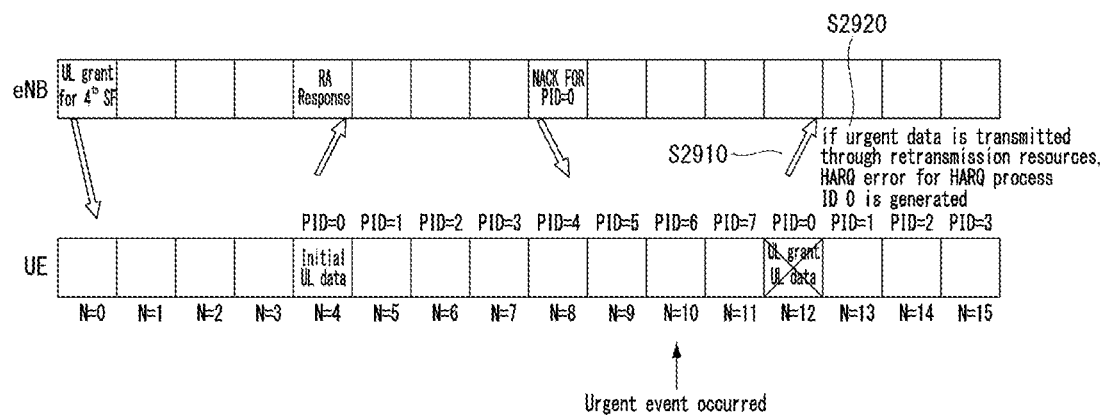
【Figure 30】
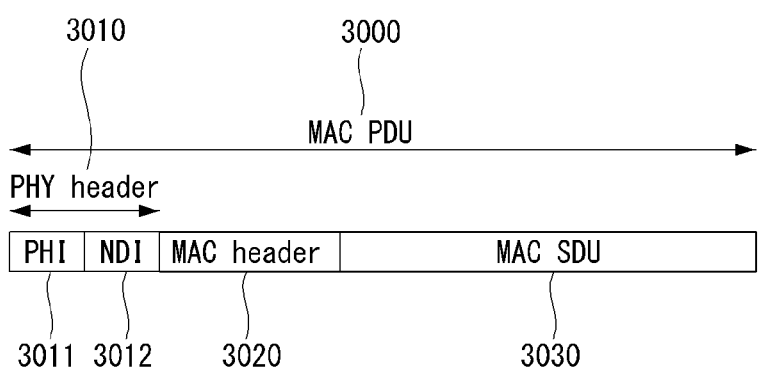

[Figure 31]
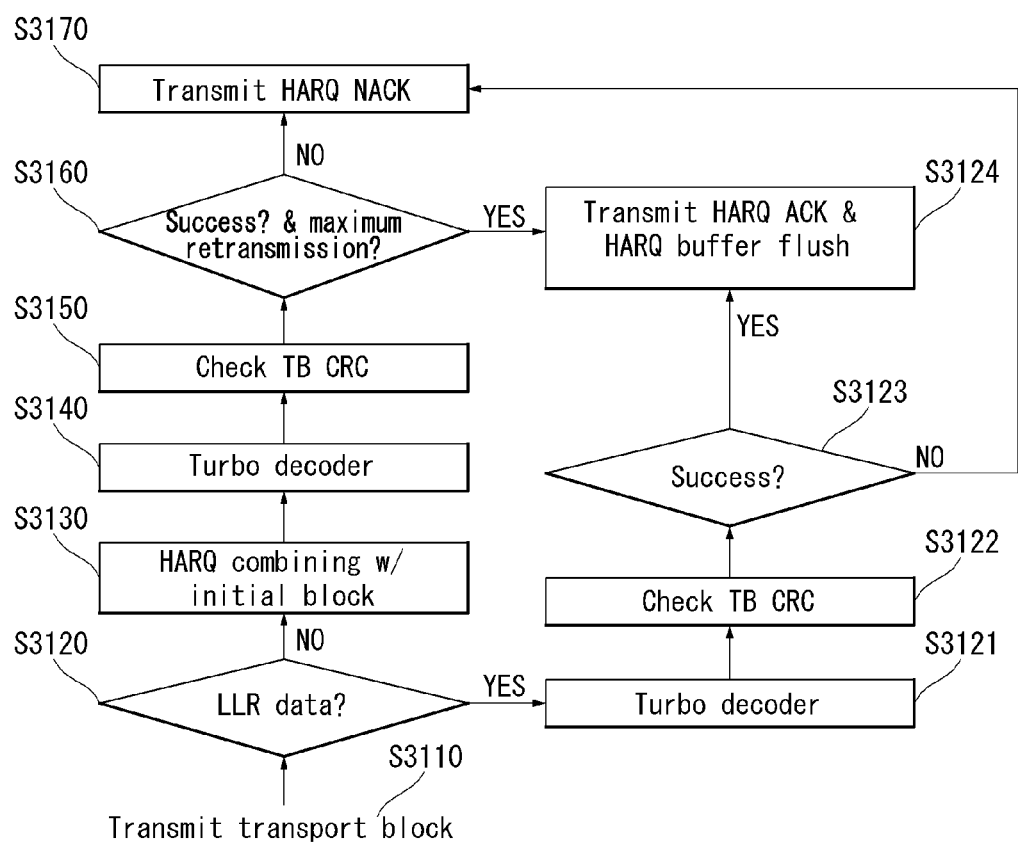

【Figure 32】
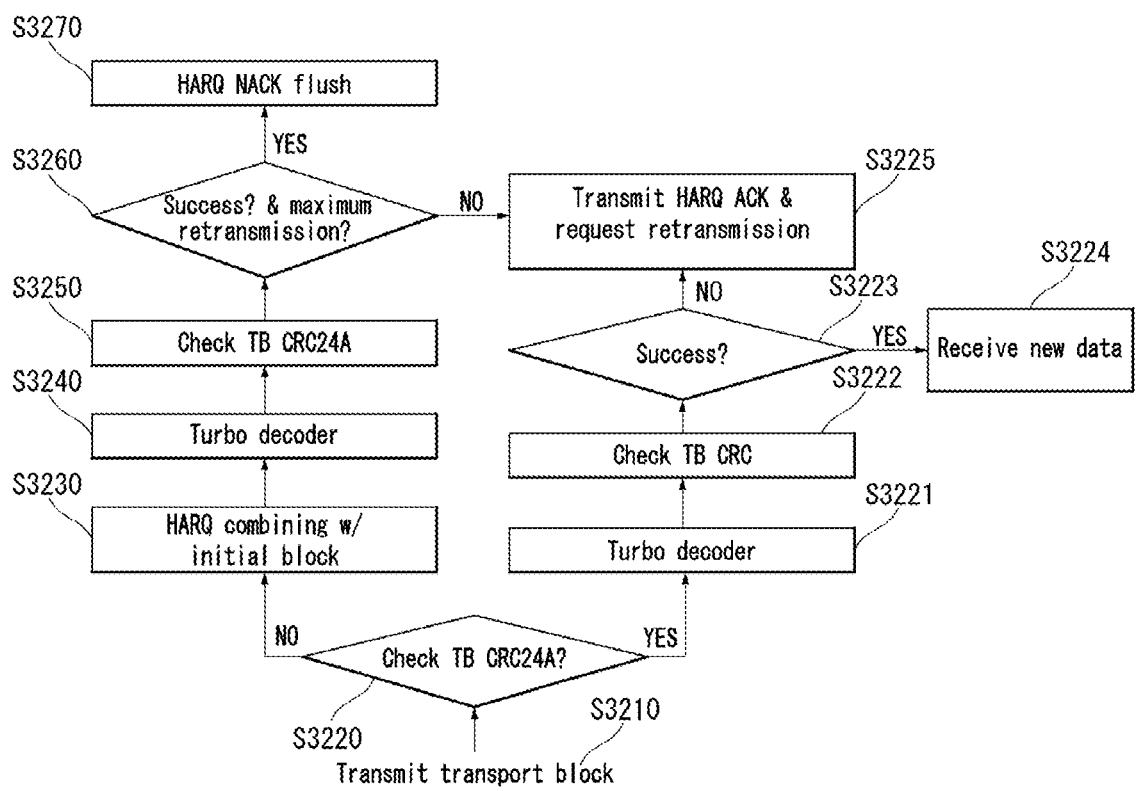

【Figure 33】
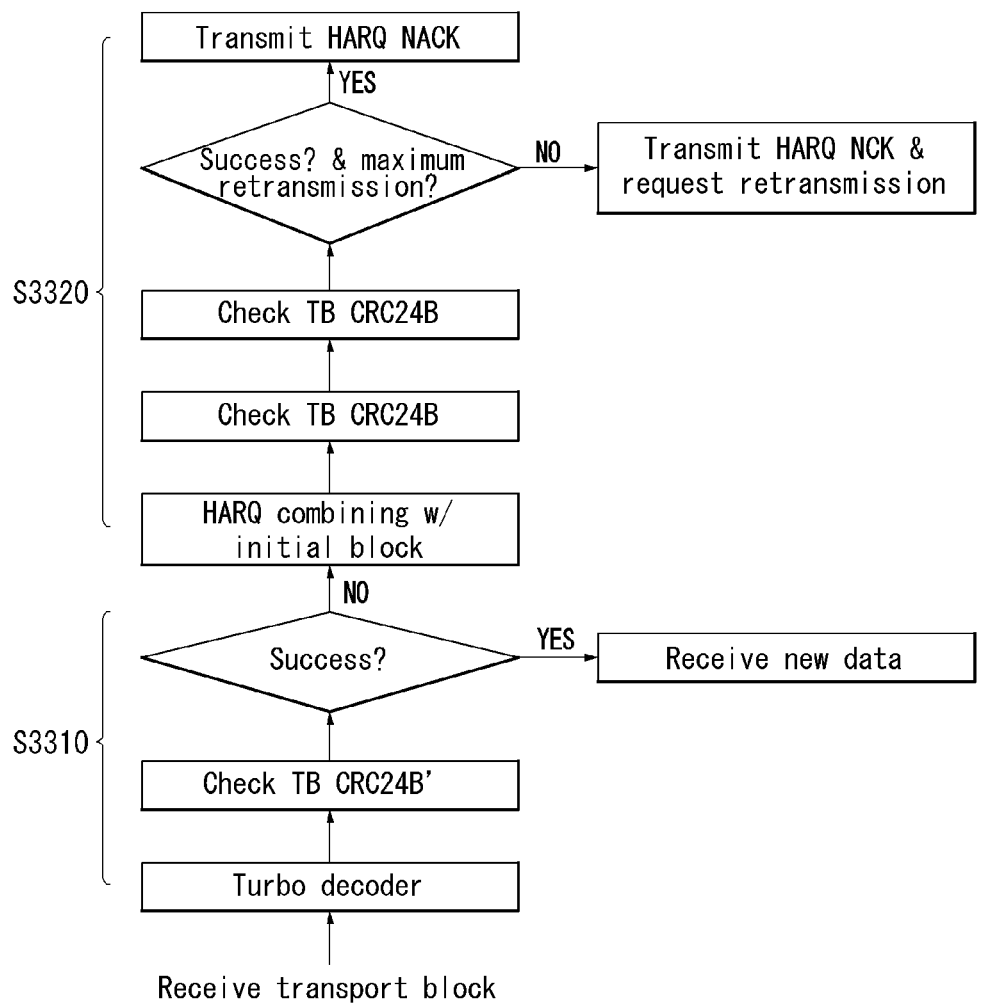

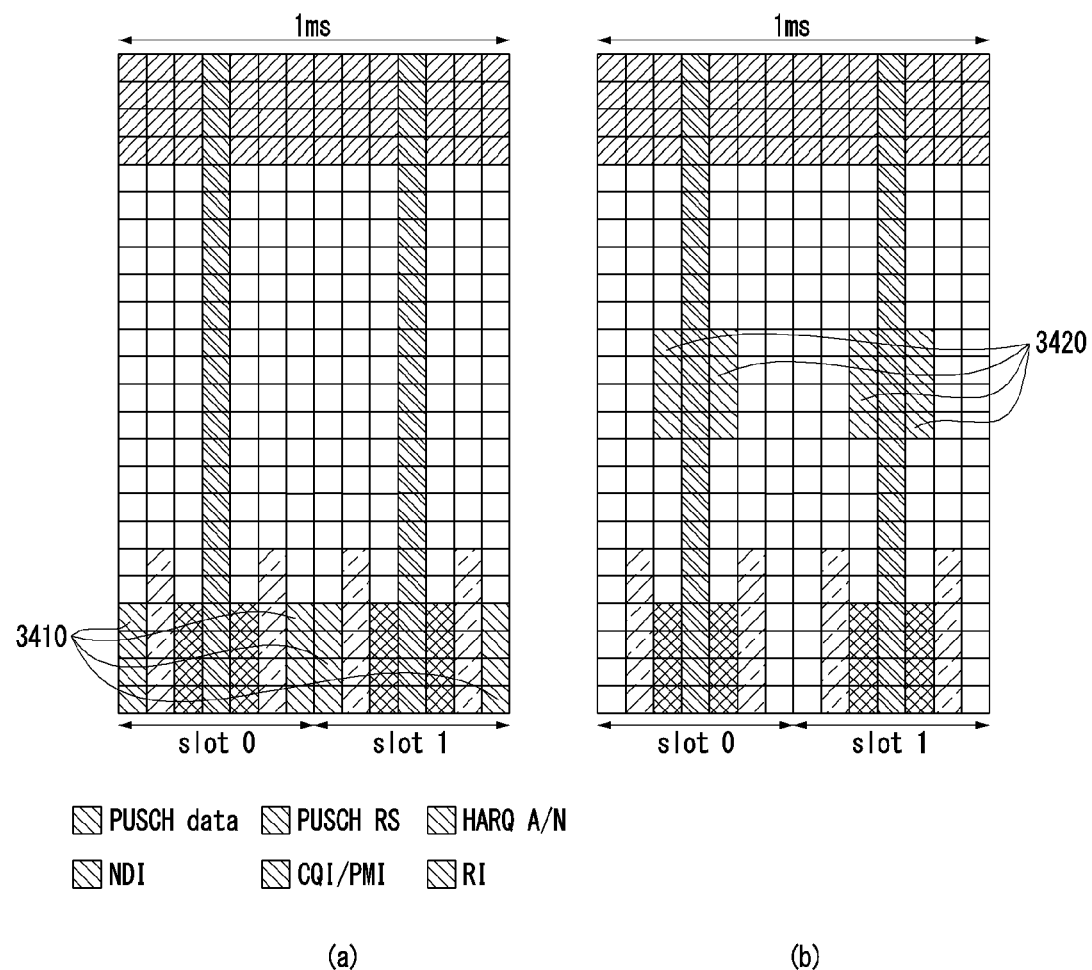

【Figure 35】
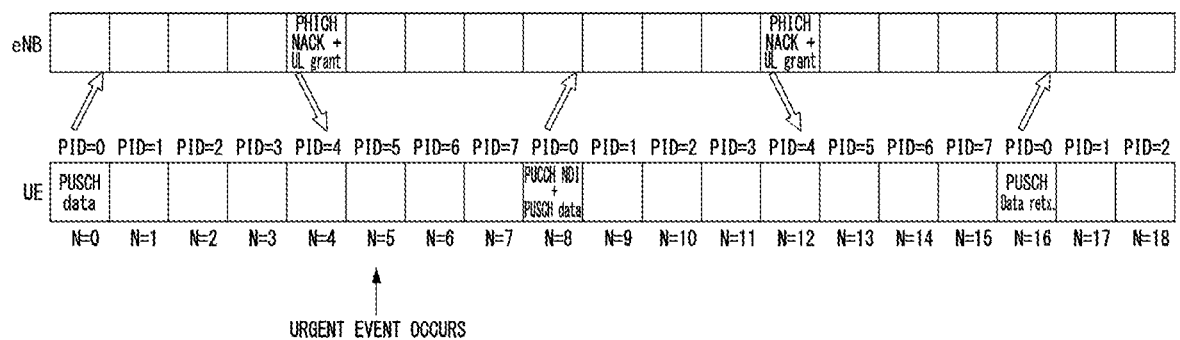

[Figure 36]
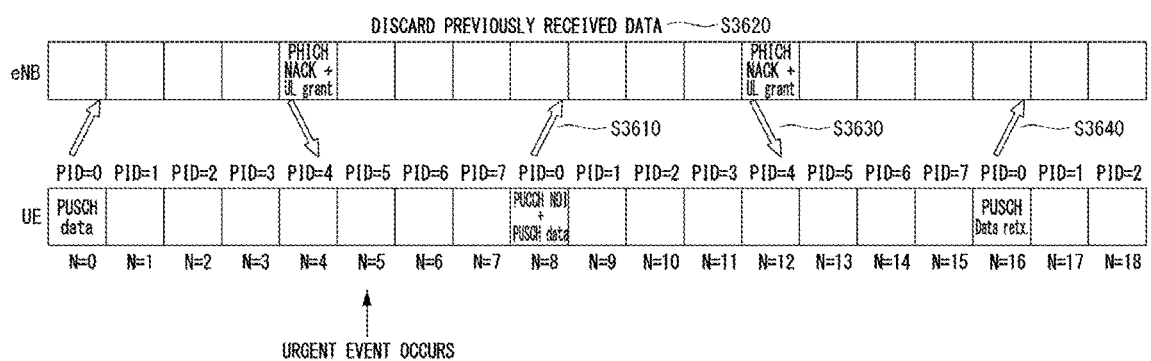

【Figure 37】
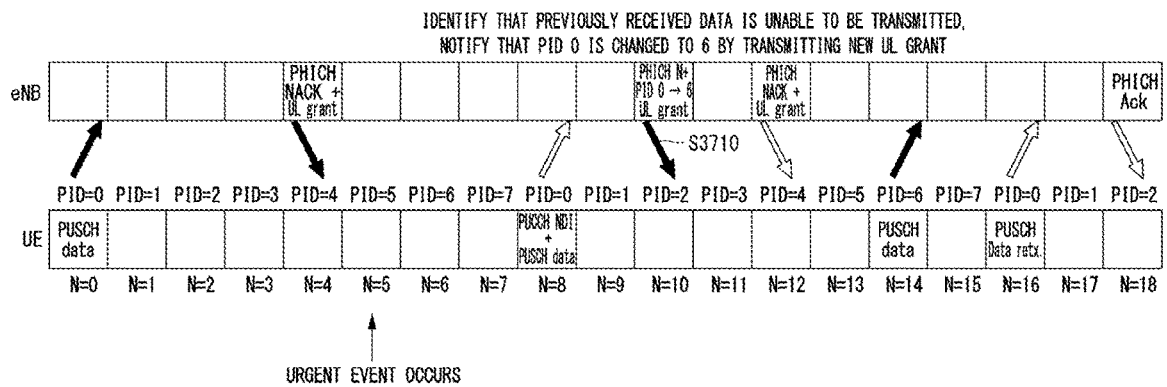
【Figure 38】
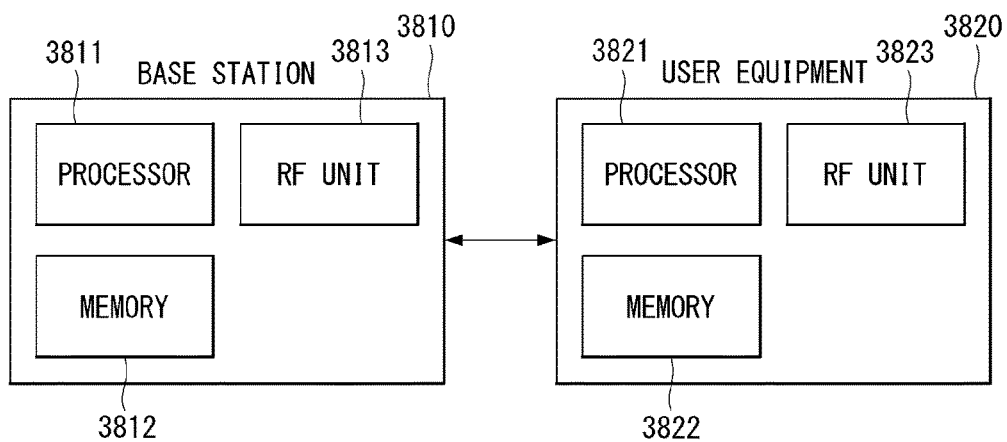

METHOD FOR TRANSMITTING AND RECEIVING UPLINK DATA IN WIRELESS COMMUNICATION SYSTEM AND DEVICE FOR SAME

CROSS-REFERENCE TO RELATED APPLICATIONS

[0] This application is a continuation of U.S. patent application Ser. No. 15/741,499, filed on Jan. 2, 2018, U.S. Pat. No. 10,492,174, which is the National Stage filing under 35 U.S.C. 371 of International Application No. PCT/KR2015/013067, filed on Dec. 2, 2015, which claims the benefit of U.S. Provisional Application No. 62/187,827, filed on Jul. 2, 2015, the contents of which are all hereby incorporated by reference herein in its entirety.

TECHNICAL FIELD

The present invention relates to wireless communication systems, and more particularly, to a method for transmitting and receiving uplink data and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

Previously, a user equipment may transmit data faster by occupying resource by data of which priority is high according to uplink data prioritization in the user equipment by using the resource allocated to the user equipment itself.

However, in the case that a user equipment transmits data which is different from that of an initial transmission by using HARQ retransmission resource, a problem may occur that HARQ process is failed to operate properly as described above.

The retransmission resource of a user equipment is also a resource that a base station allocates to the user equipment. However, owing to the reason described above, even in the case that data of high priority occurs to the user equipment, an abruptly generated data may be transmitted by allocating with a new resource only after waiting for the retransmission of the previous data being completed.

As such, in the case that HARQ retransmission is performing on the time when urgent data is generated, long time delay may occur for a user equipment to perform a resource request for urgent data transmission.

In the worst case, in the case that HARQ retransmission occurs as much as the maximum retransmission count and all (8 for LTE) HARQ processes are performing, a user equipment is able to be newly allocated with a resource for urgent data after maximum 32 ms.

Accordingly, the present disclosure proposes, in the case that it is required to transmit urgent data when an urgent event occurs, a method for transmitting urgent data by using the resource allocated to the user equipment itself.

Particularly, an object of the present disclosure is to provide a method for defining and transmitting new data indication (NDI) information indicating whether the uplink data transmitted and received through retransmission data is retransmission data or new data.

In addition, object of the present disclosure is to provide a method for transmitting the NDI information through a PUSCH resource.

The technical objects to attain in the present disclosure are not limited to the above-described technical objects and other technical objects which are not described herein will become apparent to those skilled in the art from the following description.

Technical Solution

In the present disclosure, a method for transmitting and receiving uplink (UL) data performed by a user equipment (UE) in a wireless communication system includes receiving a first UL grant from a base station (BS); transmitting a first UL data to the BS based on the first UL grant; receiving a HARQ response of the first UL data from the BS; transmitting a second UL data to the BS based on a retransmission resource allocated for retransmitting the first UL data; and transmitting control information indicating whether the second UL data is a retransmission data of the first UL data or a new data generated due to a specific event to the BS.

In addition, in the present disclosure, the control information is transmitted to the BS in a PUSCH resource.

In addition, in the present disclosure, the control information includes the second UL data and a MAC packet data unit (PDU), and the MAC PDU further includes PHY header including the control information.

In addition, in the present disclosure, the PHY header further includes PHY header Indicator (PHI) field indicating whether the PHY header is included in the MAC PDU.

In addition, in the present disclosure, the PHY header is added in front of MAC header.

In addition, the present disclosure further includes receiving a second UL grant from the BS; and transmitting the second UL data to the BS based on the received second UL grant, when the second UL data is the retransmission data of the first UL data.

In addition, in the present disclosure, the second UL grant is received from the BS together with the HARQ response.

In addition, in the present disclosure, the control information indicates a type of CRC, the control information uses a first CRC type when the second UL data is the retransmission data of the first UL data, and the control uses a second CRC type when the second UL data is the new data.

In addition, in the present disclosure, the type of CRC is determined depending on whether a transport block (TB) of the retransmission data or the new data is segmented.

In addition, in the present disclosure, the second UL data or the control information is multiplexed.

In addition, in the present disclosure, the control information is mapped to a specific resource element (RE) of the retransmission resource.

In addition, in the present disclosure, a transport resource of the second UL data and a transport resource of the control information are not overlapped.

In addition, in the present disclosure, the control information is mapped to at least one symbol of a lowest subcarrier index of the retransmission resource or mapped to at least one symbol of a center subcarrier index of the retransmission resource.

In addition, the present disclosure further includes receiving a downlink (DL) data to the BS; and transmitting a HARQ response of the received DL data to the BS, and the control information is transmitted with being multiplexed with the HARQ response of the received DL data.

In addition, in the present disclosure, the control information and the HARQ response of the received DL data are distinguished by an orthogonal sequence.

In addition, in the present disclosure, the HARQ response of the first UL data is HARQ NACK.

In addition, in the present disclosure, a method for transmitting and receiving uplink (UL) data performed by a base station (BS) in a wireless communication system includes transmitting a first UL grant from a user equipment (UE); receiving a first UL data from the UE; transmitting a HARQ response of the first UL data to the UE; receiving a second UL data through a retransmission resource allocated to the UE for retransmitting the first UL data from the UE; and receiving control information indicating whether the second UL data is a retransmission data of the first UL data or a new data generated due to a specific event from the UE.

In addition, the present disclosure further includes determining to perform HARQ combining between the first UL data and the second UL data based on the received control information.

In addition, in the present disclosure, when the second UL data indicates retransmission data of the first UL data, the first UL data and the second UL data are HARQ combined, and when the second UL data indicates the new data, the first UL data stored in a HARQ buffer is discarded or separately stored.

In addition, the present disclosure further includes transmitting HARQ NACK indicating a reception failure of the first UL data to the UE; and receiving the retransmission data of the first UL data from the UE when the second UL data is the new data.

In addition, the present disclosure further includes transmitting HARQ NACK indicating a reception failure of the first UL data to the UE; and receiving the retransmission data of the second UL data from the UE when the second UL data is the new data.

In addition, the present disclosure further includes transmitting a second UL grant for newly allocating a retransmission resource of the first UL data to the UE; and receiving the retransmission data of the first UL data from the UE based on the second UL grant.

In addition, the present disclosure further includes transmitting indication information for indicating that a HARQ process ID of the first UL data is changed to the UE.

In addition, in the present disclosure, the indication information is included in the second UL grant.

In addition, in the present disclosure, a user equipment (UE) for transmitting and receiving uplink (UL) data in a wireless communication system includes a radio frequency (RF) unit for transmitting and receiving a radio signal; and a processor functionally connected to the RF unit, and the processor is configured to perform: receiving a first UL grant from a base station (BS); transmitting a first UL data to the BS based on the first UL grant; receiving a HARQ response of the first UL data from the BS; transmitting a second UL data to the BS based on a retransmission resource allocated for retransmitting the first UL data; and transmitting control information indicating whether the second UL data is retransmission data of the first UL data or new data generated due to a specific event to the BS.

Technical Effects

According to the present disclosure, there is an effect of decreasing a data transmission delay time that may require maximum 32 ms to be within 1 to 3 ms by transmitting urgent data using a retransmission resource in the case that an urgent event occurs in a user equipment and it is required to transmit urgent data.

Through this, according to the present disclosure, there is an effect of transmitting urgent data faster and safely.

The technical effects of the present disclosure are not limited to the technical effects described above, and other technical effects not mentioned herein may be understood to those skilled in the art from the description below.

DESCRIPTION OF DRAWINGS

The accompanying drawings included as part of the detailed description in order to help understanding of the present invention provide embodiments of the present invention and describe the technical characteristics of the present invention along with the detailed description.

FIG. 1 illustrates an example of a network structure of an evolved universal terrestrial radio access network (E-UTRAN) to which the present invention can be applied.

FIG. 2 illustrates a radio interface protocol structure between a UE and an E-UTRAN in the wireless communication system to which the present invention can be applied.

FIG. 3 is a diagram for describing physical channels and a general signal transmission method using them used in the 3GPP LTE/LTE-A system to which the present invention can be applied.

FIG. 4 is a diagram showing the structure of a radio frame used in a 3GPP LTE/LTE-A system to which the present invention can be applied.

FIG. 5 shows an example of a resource grid for one downlink slot in the wireless communication system to which the present invention can be applied.

FIG. 6 shows a structure of a downlink subframe in the wireless communication system to which the present invention can be applied.

FIG. 7 shows a structure of an uplink subframe in the wireless communication system to which the present invention can be applied.

FIG. 8 illustrates the MAC PDU used in the MAC entity in the wireless communication system to which the present invention can be applied.

FIG. 9 and FIG. 10 illustrate the sub-header of the MAC PDU in the wireless communication system to which the present invention can be applied.

FIG. 11 illustrates formats of the MAC control elements in order to report the buffer state in the wireless communication system to which the present invention can be applied.

FIG. 12 illustrates a UL resource allocation procedure of a UE in the wireless communication system to which the present application can be applied.

FIG. 13 illustrates an example of a random access procedure to which present application can be applied.

FIG. 14 illustrates an example of a type in which PUCCH formats are mapped to a PUCCH region of an uplink physical resource block in the wireless communication system to which the present invention may be applied.

FIG. 15 shows the structure of an ACK/NACK channel in the case of a common CP in a wireless communication system to which an embodiment of the present invention may be applied.

FIG. 16 illustrates an example of asynchronous HARQ operation in downlink.

FIG. 17 illustrates an example of synchronous HARQ operation in downlink.

FIG. 18 is a diagram illustrating an example of DCI format 0.

FIG. 19 is a block diagram illustrating a structure of a PDCCH.

FIG. 20 illustrates an example of resource mapping of a PDCCH.

FIG. 21 illustrates an example of distributing CCEs across a system band.

FIG. 22 illustrates an example of PDCCH monitoring.

FIG. 23 is a diagram illustrating an example of a logical channel prioritization in the LTE system.

FIG. 24 illustrates an example of a signal processing procedure of a UL shared channel which is a transport channel in a wireless communication system to which the present invention may be applied.

FIGS. 25 and 26 are diagrams illustrating an example of a method for transmitting actual data through scheduling request and BSR procedure.

FIG. 27 is a diagram illustrating an example of a method for transmitting actual data through RACH procedure.

FIG. 28 is a diagram illustrating an example of a method for transmitting UL data quickly by using a retransmission resource proposed in the present disclosure.

FIG. 29 is a diagram illustrating a problem that may occur in a method for transmitting urgent data by preempting a retransmission resource.

FIG. 30 is a diagram illustrating an example of a MAC PDU format including PHY header proposed in the present disclosure.

FIG. 31 is a flowchart illustrating an example of a decoding method of a transport block including a PHY header proposed in the present disclosure.

FIG. 32 illustrates a CRC check procedure in the case that TB segmentation does not occur for the data transmitted by a UE.

FIG. 33 is a flowchart illustrating another example of a method for decoding a transport block through new CRC check proposed in the present disclosure.

FIG. 34 is a diagram illustrating an example of a method for mapping a resource element (RE) for NDI proposed in the present disclosure.

FIG. 35 is a diagram illustrating an example of a HARQ operation method in the case that HARQ process is not performed for a UL data transmission through a preemption resource proposed in the present disclosure.

FIG. 36 is a diagram illustrating an example of a HARQ operation method in the case that HARQ is performed for new data transmitted using a retransmission resource proposed in the present disclosure.

FIG. 37 is a diagram illustrating an example of a HARQ operation method in the case that HARQ is performed for new data transmitted using a retransmission resource proposed in the present disclosure.

FIG. 38 illustrates a block diagram of a wireless communication apparatus to which the methods proposed in the present disclosure may be applied.

BEST MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention May be Applied

FIG. 1 illustrates a schematic structure a network structure of an evolved universal mobile telecommunication system (E-UTRAN) to which the present invention can be applied.

An E-UTRAN system is an evolved version of the UTRAN system. For example, the E-UTRAN may be also referred to as an LTE/LTE-A system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMES/S-GWs and eNBs.

FIG. 2 illustrates the configurations of a control plane and a user plane of a radio interface protocol between the E-UTRAN and a UE in the wireless communication system to which the present invention can be applied.

FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/ NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REG-ISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path latency of a downlink signal between the uplink and the downlink.

The structure of the radio frame is only exemplary and the number of subframes included in the radio frame, the number of slots included in the subframe, or the number of symbols included in the slot may be variously changed.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, 1) in the slot. Here, k (k=0, NRB×12−1) denotes an index of subcarrier in the frequency domain, and 1(1=0, . . . , 6) denotes an index of symbol in the time domain. The number NDL of resource blocks included in the downlink slot depends on a downlink transmission bandwidth determined in a cell.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARD). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

The DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Buffer Status Reporting (BSR)

FIG. 8 illustrates the MAC PDU used in the MAC entity in the wireless communication system to which the present invention can be applied.

Referring to FIG. 8, the MAC PDU includes a MAC header, at least one MAC service data unit (SDU) and at least one control element, additionally may include padding. In some cases, at least one of the MAC SDUs and the MAC control elements may not be included in the MAC PDU.

As an example of FIG. 8, it is common that the MAC control elements are located ahead of the MAC SDUs. And the size of MAC control elements may be fixed or changeable. In case that the size of MAC control elements is changeable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 8, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 8, six header fields may be included. Particularly, the sub-header may include six header fields of R/R/E/LCID/F/L.

For the sub-header corresponding to the very last one among the sub-header corresponding to the MAC control element of fixed size and data fields included in the MAC PDU, as an example illustrated in FIG. 8, the sub-header that is included four header fields may be used. In case that the sub-header includes four fields like this, the four fields may be R/R/E/LCID.

FIG. 9 and FIG. 10 illustrate the sub-header of the MAC PDU in the wireless communication system to which the present invention can be applied.

Each field is described as below with reference to FIG. 9 and FIG. 10.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

LCID: Logical channel identification field identifies a logical channel corresponding to the relevant MAC SDU or identifies a type of the relevant MAC control element and padding. If the MAC SDU is associated with the sub-header, it may show which logical channel the MAC SDU is corresponding to, and if the MAC control element is associated with the sub-header, it may show what the MAC control element is.

Table 2 represents the value of LCID for the DL-SCH

TABLE 2

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 3 represents the value of LCID for the UL-SCH

TABLE 3

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index value among truncated BSR, short BSR, and long BSR in the LCID field.

The relationship of mapping between the index and the LCID value illustrated in Table 2 and Table 3 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used (FIG. 9(a)), otherwise, the 15-bit L field may be used (FIG. 9(b)). In case that the size of MAC control element is changeable, the size of MAC control element may be defined by the L field. In case that the size of MAC control element is fixed, the size of MAC control element may be determined without the size of MAC control element being defined by the L field, accordingly the F and L field may be omitted as shown in FIG. 10.

FIG. 11 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 11(a), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCID field of sub-header, the MAC control element corresponding to the sub-header, as shown in FIG. 11(b), may include four buffer size fields indicating the buffer state of four groups having 0 to 3 LCG Each of the buffer size fields may be used for identifying the total amount of available data from different logical channel groups.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 12 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 12(a) exemplifies a UL resource allocation procedure for actual data in case that the UL radio resources for the buffer status reporting (BSR) are not allocated to a UE. That is, for a UE that switches a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 12(a), the case that the PUSCH resource for transmitting the BSR is not allocated to a UE is illustrated, and the UE transmits the scheduling request (SR) to an eNB first in order to be allocated with the PUSCH resources (step, S1201).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step, S1203), the UE transmits the triggered BSR through the PUSCH resources which are allocated by the UL grant (step, S1205).

The eNB verifies the quality of data that the UE actually transmit to the UL through the BSR, and transmits the UL grant for the PUSCH resources for actual data transmission to the UE (step, S1207). The UE that receives the UL grant for actual data transmission transmits the actual UL data to the eNB through the PUSCH resources (step, S1209).

FIG. 12(b) exemplifies the UL resource allocation procedure for actual data in case that the UL radio resources for the BSR are allocated to a UE.

Referring to FIG. 12(b), the case that the PUSCH resources for BRS transmission are already allocated to a UE is illustrated. In the case, the UE transmits the BSR through the allocated PUSCH resources, and transmits a scheduling request to an eNB (step, S1211). Subsequently, the eNB verifies the quality of data to be transmitted to the UL by the UE through the BSR, and transmits the UL grant for the PUSCH resources for actual data transmission to the UE (step, S1213). The UE that receives the UL grant for actual data transmission transmits the actual UL data to the eNB through the allocated PUSCH resources (step, S1215).

FIG. 13 is a diagram for describing a latency in C-plane required in 3GPP LTE-A to which the present invention can be applied.

Referring to FIG. 13, 3GPP LTE-A requests a transition time from an idle mode (a state that IP address is allocated) to a connected mode to be less than 50 ms. In this time, the transition time includes a configuration time (except latency for transmitting S1) in a user plane (U-plane). In addition, a transition time from a dormant state to an active state in the connection mode is requested to be less than 10 ms.

The transition from the dormant state to the active state may occur in 4 scenarios as follows.

Uplink initiated transition, synchronized
Uplink initiated transition, unsynchronized
Downlink initiated transition, synchronized
Downlink initiated transition, unsynchronized
Random Access Channel (RACH) Procedure FIGS. 13a and 13b illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 13a illustrates one example of a contention-based random access procedure, and FIG. 13b illustrates one example of a non-contention based random access procedure.

First, the contention-based random access procedure will be described with reference to FIG. 13a.

The UE receives information about random access from the eNB through system information and stores the received information. Afterwards, in case random access is needed, the UE transmits a random access preamble (which is also called a message 1) to the eNB S1301.

If the eNB receives a random access preamble from the UE, the eNB transmits a random access response message (which is also called a message 2) to the UE S1302. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S1303. At this time, uplink transmission may be described as scheduled transmission.

After receiving the uplink transmission from the UE, the eNB transmits a message for contention resolution (which is also called a message 4) to the UE through a downlink shared channel (DL-SCH) S1304.

Next, a non-contention based random access procedure will be described with reference to FIG. 13b.

Before the UE transmits a random access preamble, the eNB allocates a non-contention random access preamble to the UE S1311.

The non-contention random access preamble can be allocated through a handover command or dedicated signaling such as signaling through the PDCCH. In case non-contention random access preamble is allocated to the UE, the UE transmits the allocated non-contention random access preamble to the eNB S1312.

Afterwards, similarly to the S1302 step of the contention-based random access procedure, the UE can transmit a random access response (which is also called a message 2) to the UE S1313.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

Physical Uplink Control Channel (PUCCH)

Uplink control information (UCI) transmitted through a PUCCH may include a scheduling request (SR), HARQ ACK/NACK information and downlink channel measurement information.

The HARQ ACK/NACK information may be generated depending on whether a downlink data packet on a PDSCH has been successfully decoded or not. In an existing wireless communication system, 1 bit is transmitted as ACK/NACK information with respect to the transmission of downlink single codeword, and 2 bits are transmitted as ACK/NACK information with respect to the transmission of downlink 2 codewords.

The channel measurement information refers to feedback information related to a multiple input multiple output (MIMO) scheme, and may include a channel quality indicator (CQI), a precoding matrix index (PMI) and a rank indicator (RI). Pieces of these channel measurement information may be collectively expressed as a CQI.

For the transmission of a CQI, 20 bits may be used per subframe.

A PUCCH may be modulated using binary phase shift keying (BPSK) scheme and a quadrature phase shift keying (QPSK) scheme. Control information of a plurality of UEs may be transmitted through a PUCCH. If code division multiplexing (CDM) is performed to distinguish the signals of UEs, a constant amplitude zero autocorrelation (CAZAC) sequence of a length 12 is chiefly used. The CAZAC sequence has a characteristic in that it maintains constant amplitude in a time domain and a frequency domain, and thus has a property suitable for increasing coverage by lowering the peak-to-average power ratio (PAPR) or cubic metric (CM) of a UE. Furthermore, ACK/NACK information for downlink data transmission transmitted through a PUCCH is covered using orthogonal sequence or orthogonal cover (OC).

Furthermore, control information transmitted on a PUCCH may be distinguished using a cyclically shifted sequence having a different cyclic shift (CS) value. The cyclically shifted sequence may be generated by cyclically shifting a base sequence by a specific CS amount. The specific CS amount is indicated by a CS index. The number of available cyclic shifts may be different depending on the latency spread of a channel. A variety of types of sequences may be used as the base sequence, and the aforementioned CAZAC sequence is an example thereof.

Furthermore, the amount of control information which may be transmitted by a UE in one subframe may be determined depending on the number of SC-FDMA symbols which may be used to send control information (i.e., SC- FDMA symbols other than an SC-FDMA symbol used in the transmission of a reference signal (RS) for the coherent detection of a PUCCH.

In the 3GPP LTE system, a PUCCH is defined as a total of different formats depending on transmitted control information, a modulation scheme and the amount of control information. The attributes of uplink control information (UCI) transmitted may be summarized as in Table 4 below depending on each PUCCH format.

TABLE 4

| PUCCH format | Modulation scheme | # of bits per subframe | Usage |
| --- | --- | --- | --- |
| 1(x) | N/A | N/A | Scheduling Request |
| 1a | BPSK | 1 | 1-bit A/N + SR |
| 1b | QPSK | 2 | 2-bits A/N + SR |
| 2x | QPSK | 20 | CQI or CQI + A/N |
| 2a | QPSK + BPSK | 20 + 1 | CQI + 1-bit A/N |
| 2b | QPSK + BPSK | 20 + 2 | CQI + 2-bits A/N |
| 3 | QPSK | 48 | A/N + SR |

PUCCH format 1(x) is used for SR-only transmission. In the case of SR-only transmission, a waveform which is not modulated is applied.

The PUCCH format 1a or 1b is used to transmit HARQ ACK/NACK. In the case that HARQ ACK/NACK is solely transmitted in a specific subframe, PUCCH format 1a or 1b may be used. Alternatively, HARQ ACK/NACK and an SR may be transmitted in the same subframe using PUCCH format 1a or 1b.

As described above, PUCCH format 1a or 1b may be used for the case that an SR is transmitted together with HARQ ACK/NACK. A PUCCH index for HARQ ACK/NACK is implicitly determined from a lower CCE index which is mapped for the related PDCCH.

Multiplexing Negative SR with A/N
  A UE transmits A/N to A/N PUCCH resource which is mapped to the lowest CCE index used in a PDCCH.
Multiplexing Positive SR with A/N
  A UE transmits A/N using the SR PUCCH resource allocated from an eNB.

PUCCH format 2 is used for the transmission of a CQI, and PUCCH format 2a or 2b is used for the transmission of a CQI and HARQ ACK/NACK.

In the case of the extended CP, PUCCH format 2 may also be used for the transmission of a CQI and HARQ ACK/NACK.

An SR resource of a UE is setup/released through an RRC Connection Reconfig. (Radio Resource Config. Dedicated (Physical config. Dedicated (SR config))).

Here, SR resource for maximum 2048 UEs is available to be allocated in one subframe. This means that 2048 logical indexes are defined for PUCCH, and the physical resource for PUCCH formats 1 to 3 may be mapped up to 2048 logically.

It is designed that an SR periodicity may be set to 1 ms to 80 ms according to an SR configuration index in the configuration of SR resource per UE, and an SR subframe offset is also configured according to an index.

An SR signaling of a UE is defined to use simple On-Off Keying (O.O.K) scheme, and defined to mean that D(0)=1: Request a PUSCH resource (positive SR), Transmitting nothing: not request to be scheduled (negative SR).

In addition, an SR is designed to use the CAZAC sequence having the length of 12 and the OC sequences having the length of 3 such that the SR for maximum 36 UEs is able to be allocated through PUCCH 1 RB (in the case of the Normal CP).

A DMRS position of PUCCH format 1/1a/1b (A/N, SR) will be described in detail below in FIG. 14.

FIG. 14 illustrates an example of a type in which PUCCH formats are mapped to a PUCCH region of an uplink physical resource block in the wireless communication system to which the present invention may be applied.

In FIG. 14, $N_{RB}^{UL}$ represents the number of resource blocks in the uplink, and $0, 1, \ldots, N_{RB}^{UL}-1$ mean the numbers of physical resource blocks. Basically, the PUCCH is mapped to both edges of an uplink frequency block. As illustrated in FIG. 14, PUCCH format 2/2a/2b is mapped to a PUCCH region expressed as m=0, 1 and this may be expressed in such a manner that PUCCH format 2/2a/2b is mapped to resource blocks positioned at a band edge. Furthermore, both PUCCH format 2/2a/2b and PUCCH format 1/1a/1b may be mixedly mapped to a PUCCH region expressed as m=2.

Next, PUCCH format 1/1a/1b may be mapped to a PUCCH region expressed as m=3, 4, and 5. The number $(N_{RB}^{(2)})$ of PUCCH RBs which are usable by PUCCH format 2/2a/2b may be indicated to UEs in a cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency unit (or a frequency resolution) to be measured may be controlled by an eNB. In the time domain, periodic and aperiodic CQI reporting may be supported. PUCCH format 2 may be used for only the periodic reporting and the PUSCH may be used for aperiodic reporting. In the case of the aperiodic reporting, an eNB may instruct a UE to transmit a scheduling resource on which an individual CQI reporting is carried for the uplink data transmission.

PUCCH Channel Structure

The PUCCH formats 1a and 1b are described.

In the PUCCH formats 1a/1b, a symbol modulated using the BPSK or QPSK modulation scheme is multiplied by a CAZAC sequence of a length 12. For example, the results of the multiplication of a modulation symbol d(0) by a CAZAC sequence r(n) (n=0, 1, 2, . . . , N−1) of a length N are y(0), y(1), y(2), . . . , y(N−1). y(0), . . . , y(N−1) symbols may be called a block of symbols. After a modulation symbol is multiplied by a CAZAC sequence, block-wise spreading using an orthogonal sequence is applied.

A Hadamard sequence of a length 4 is used for common ACK/NACK information, and a discrete Fourier transform (DFT) sequence of a length 3 is used for shortened ACK/NACK information and a reference signal.

A Hadamard sequence of a length 2 is used for a reference signal in the case of an extended CP.

FIG. 15 shows the structure of an ACK/NACK channel in the case of a common CP in a wireless communication system to which an embodiment of the present invention may be applied.

FIG. 15 illustrates the structure of a PUCCH channel for the transmission of HARQ ACK/NACK without a CQI.

A reference signal (RS) is carried on three contiguous SC-FDMA symbols that belong to seven SC-FDMA symbols included in one slot and that are located in the middle part, and an ACK/NACK signal is carried on the remaining four SC-FDMA symbols.

In the case of an extended CP, an RS may be carried on two contiguous symbols in the middle. The number and location of symbols used for an RS may be different depending on a control channel. The number and location of symbols used for an ACK/NACK signal associated with the RS may also be changed depending on the RS.

Pieces of acknowledgement information (an unscrambled state) of 1 bit and 2 bits may be expressed as one HARQ ACK/NACK modulation symbol using the BPSK and QPSK modulation schemes, respectively. Positive acknowledgement (ACK) may be encoded into "1", and negative acknowledgement (NACK) may be encoded into "0."

2-dimensional spreading is applied in order to improve a multiplexing capacity when a control signal is transmitted within an allocated band. That is, in order to increase the number of UEs or the number of control channels that may be multiplexed, frequency domain spreads and time domain spreads are applied at the same time.

In order to spread an ACK/NACK signal in the frequency domain, a frequency domain sequence is used as a base sequence. A Zadoff-Chu (ZC) sequence, that is, one of CAZAC sequences, may be used as a frequency domain sequence. For example, the multiplexing of different UEs or different control channels may be applied by applying a different cyclic shift (CS) to a ZC sequence, that is, a base sequence. The number of CS resources supported in an SC-FDMA symbol for PUCCH RBs for the transmission of HARQ ACK/NACK is set by a cell-specific higher layer signaling parameter $\Delta_{shift}^{PUCCH}$.

An ACK/NACK signal on which frequency domain spreading has been performed is spread in the time domain using orthogonal spreading code. A Walsh-Hadamard sequence or DFT sequence may be used as the orthogonal spreading code. For example, an ACK/NACK signal may be spread using orthogonal sequences w0, w1, w2 and w3 of a length 4 with respect to four symbols. Furthermore, an RS is also spread through an orthogonal sequence of a length 3 or a length 2. This is called orthogonal covering (OC).

A plurality of UEs may be multiplexed according to a code division multiplexing (CDM) method using the aforementioned CS resources in the frequency domain and the aforementioned OC resources in the time domain. That is, the ACK/NACK information and RSs of a large number of UEs on the same PUCCH RB may be multiplexed.

With respect to such time domain spreading CDM, the number of spreading codes supported with respect to ACK/NACK information is limited by the number of RS symbols. That is, since the number of RS transmission SC-FDMA symbols is smaller than that of ACK/NACK information transmission SC-FDMA symbols, the multiplexing capacity of an RS is smaller than that of ACK/NACK information.

For example, in the case of a common CP, ACK/NACK information may be transmitted in four symbols. Three orthogonal spreading codes not four orthogonal spreading codes are used for ACK/NACK information. The reason for this is that since the number of RS transmission symbols is limited to three, only the three orthogonal spreading codes may be used for an RS.

In the case where three symbols are used to send an RS and four symbols are used to send ACK/NACK information in one slot of a subframe of a common CP, for example, if six CSs can be used in the frequency domain and three orthogonal cover (OC) resources can be used in the time domain, HARQ acknowledgement from a total of 18 different UEs may be multiplexed within one PUCCH RB. In the case where two symbols are used to send an RS and four symbols are used to send ACK/NACK information in one slot of a subframe of an extended CP, for example, if six CSs can be used in the frequency domain and two orthogonal cover (OC) resources can be used in the time domain, HARQ acknowledgement from a total of 12 different UEs may be multiplexed within one PUCCH RB.

The PUCCH format 1 is described below. A scheduling request (SR) is transmitted in such a manner that a UE requests scheduling or does not scheduling. An SR channel reuses the ACK/NACK channel structure in the PUCCH formats 1a/1b and is configured according to an on-off keying (OOK) method based on the ACK/NACK channel design. A reference signal is not transmitted in the SR channel. Accordingly, a sequence of a length 7 is used in the case of a common CP, and a sequence of a length 6 is used in the case of an extended CP. Different cyclic shifts or orthogonal covers may be allocated to an SR and ACK/NACK. That is, for positive SR transmission, a UE transmits HARQ ACK/NACK through resources allocated for the SR. For negative SR transmission, a UE transmits HARQ ACK/NACK through resources allocated for ACK/NACK.

An enhanced-PUCCH (e-PUCCH) format is described below. The e-PUCCH may correspond to the PUCCH format 3 of the LTE-A system. A block spreading scheme may be applied to ACK/NACK transmission using the PUCCH format 3.

The block spreading scheme is a method of modulating the transmission of a control signal using the SC-FDMA method unlike the existing PUCCH format 1 series or 2 series. As shown in FIG. 8, a symbol sequence may be spread on the time domain using orthogonal cover code (OCC) and transmitted. The control signals of a plurality of UEs may be multiplexed on the same RB using the OCC. In the case of the aforementioned PUCCH format 2, one symbol sequence is transmitted in the time domain and the control signals of a plurality of UEs are multiplexed using the cyclic shift (CS) of a CAZAC sequence. In contrast, in the case of a block spreading-based PUCCH format (e.g., the PUCCH format 3), one symbol sequence is transmitted in the frequency domain and the control signals of a plurality of UEs are multiplexed using time domain spreading using the OCC.

HARQ Process in LTE/LTE-A System

In the current LTE, 8 HARQ process is used for withdrawing error of data, and two types of HARQ are defined according to retransmission timing of data as follows.

FIG. 16 illustrates an example of asynchronous HARQ operation in downlink.

Referring to FIG. 16, when transmitting retransmission data, an eNB that receives NACK transmits the data by setting NDI in a DL grant (DCI format 1) as a bit that represents a retransmission. In this case, the NDI includes HARQ process ID, and represents which data is retransmitted.

FIG. 17 illustrates an example of synchronous HARQ operation in downlink.

Referring to FIG. 17, an eNB that transmits NACK transmits retransmission data with the same resource as an initial data transmission by allocating data resource for retransmission to a new resource by setting NDI in a DL grant (DCI format 1) as a bit that represents a retransmission, or omitting a UL grant. In this case, the retransmission timing is always fixed at the subframe after 4 ms when receiving NACK.

The HARQ scheme tries to correct error for a received code basically, and determines whether to retransmit it by using simple error detection code such as Cyclic Redundancy Check (CRC). For a retransmission, the HARQ scheme is divided into three types as follows, and LTE performs the HARQ scheme through CC (second technique) or IR (third technique).

1) Type-I HARQ Scheme: A receiver discards a packet having an error and requests for retransmission, and a transmitter transmits the packet which is the same as that of an initial transmission. By discarding a packet having an error, an increase in reliability of a system and a performance increase through FEC are obtained.

2) Type-I HARQ Scheme with Chase Combining: This is a technique, instead of discarding a packet having an error, of using the packet by combining it with a retransmitted packet. By combining several packets, an effect of increasing signal power may be obtained, consequently.

3) Type-II HARQ Scheme (Incremental redundancy Scheme): This is a technique of using a code of high code rate in an initial transmission and transmitting an additional redundancy when a retransmission occurs in order to prevent the case of transmitting a code of high redundancy in an initial transmission unnecessarily in the case of Type-I.

PHICH (Physical HARQ Indication Channel)

A PHICH is described below.

In the LTE system, since SU-MIMO is not supported in uplink, one PHICH transmits only the PUSCH of one UE, that is, 1-bit ACK/NACK for a single stream.

The 1-bit ACK/NACK is coded into three bits using a repetition code whose code rate is 1/3. Three modulation symbols are generated by modulating the coded ACK/NACK according to a binary phase key-shifting (BPSK) method. The modulation symbol is spread using a spreading factor (SF)=4 in a normal CP structure and using SF=2 in an extended CP structure.

When the modulation symbols are spread, an orthogonal sequence is used. The number of orthogonal sequences used becomes SF*2 in order to apply I/Q multiplexing.

PHICHs spread using the SF*2 orthogonal sequence may be defined as one PHICH group. Layer mapping is performed on the spread symbols. The layer-mapped symbols are subjected to resource mapping and transmitted.

A PHICH transmits HARQ ACK/NACK according to PUSCH transmission. A plurality of PHICHs mapped to the resource elements of the same set forms a PHICH group. The PHICHs within the PHICH group are distinguished by different orthogonal sequences. In the FDD system, $n_{PHICH}^{group}$ that is the number of PHICH groups is constant in all of subframes, and may be determined by Equation 1.

$$N_{PHICH}^{group} = \begin{cases} \lceil N_g(N_{RB}^{DL}/8) \rceil, & \text{for normal cyclic prefix} \\ 2 \times \lceil N_g(N_{RB}^{DL}/8) \rceil, & \text{for extended cyclic prefix} \end{cases} \quad \text{[Equation 1]}$$

In Equation 1, Ng is transmitted in a higher layer through a physical broadcast channel (PBCH), and Ng∈{1/6,1/2,1, 2}. The PBCH carries system information that is essential for a UE to communicate with an eNB. System information transmitted through the PBCH is called a master information block (MIB).

In contrast, system information transmitted through a physical downlink control channel (PDCCH) is called a system information block (SIB). $N_{RB}^{DL}$ is a downlink bandwidth configuration expressed by a multiplication of $N_{SC}^{RB}$, that is, the size of a resource block in the frequency domain. A PHICH group index $n_{PHICH}^{group}$ is any one integer of 0 to $n_{PHICH}^{group}$.

Resources used for a PHICH may be determined based on the smallest PRB index when the resources of a PUSCH are allocated and the cyclic shift value of a demodulation reference signal (DMRS) transmitted in an uplink (UL) grant.

Resources to which a PHICH is mapped (hereinafter referred to as "PHICH resources") may be expressed as $(n_{PHICH}^{group}, n_{PHICH}^{seq})$, that is, an index pair. $n_{PHICH}^{group}$ indicates a PHICH group index, and $n_{PHICH}^{seq}$ indicates an orthogonal sequence index within the PHICH group. The $(n_{PHICH}^{group}, n_{PHICH}^{seq})$ may be determined by Equation 2 below.

$$n_{PHICH}^{group} = (I_{PRB_{RA}} + n_{DMRS}) \bmod N_{PHICH}^{group} + I_{PHICH} N_{PHICH}^{group}, n_{PHICH}^{seq} = (\lfloor I_{PRB\_RA}/N_{PHICH}^{group} \rfloor + n_{DMRS}) \bmod 2N_{SF}^{PHICH} \quad \text{[Equation2]}$$

In Equation 2, the nDMRS is mapped from a cyclic shift for a demodulation reference signal (DMRS) field in the most recent PDCCH having an uplink DCI format for a transport block, which is related to the transmission of a corresponding PUSCH.

In contrast, if a PDCCH having an uplink DCI format for the same transport block is not present, an initial PUSCH for the same transport block is scheduled semi-persistently or when the initial PUSCH is scheduled by a random access response approval signal, the nDMRS is set to 0.

$N_{SF}^{PHICH}$ indicates a spreading factor size used for PHICH modulation.

$I_{PRB\_RA}$ is the same as $I_{PRB\_RA}^{lowest\_index}$ if it is the first transport block of a PUSCH related to a PDCCH or if the number of transport blocks manually recognized when a related PDCCH is not present is not the same as the number of transport blocks indicated in the most recent PDCCH related to the corresponding PUSCH.

In contrast, if it is the second transport block of a PUSCH related to the PDCCH, it is the same as $I_{PRB\_RA}^{lowest\_index}+1$. In this case $I_{PRB\_RA}^{lowest\_index}$ corresponds to the lowest PRB index of the first slot of the transmission of the corresponding PUSCH.

$n_{PHICH}^{group}$ indicates the number of PHICH groups configured by a higher layer.

$I_{PHICH}$ has "1" if a PUSCH is transmitted in a subframe index 4 or 9 and "0" if not in the uplink-downlink configuration 0 of a TDD system.

Table 5 shows a mapping relation between a cyclic shift for a DMRS field used to determine PHICH resources in a PDCCH having an uplink DCI format and an nDMRS.

TABLE 5

| Cyclic Shift for DMRS Field in PDCCH with uplink DCI format | nDMRS |
|---|---|
| 000 | 0 |
| 001 | 1 |
| 010 | 2 |
| 011 | 3 |
| 100 | 4 |
| 101 | 5 |
| 110 | 6 |
| 111 | 7 |

DCI Format 0 (UL Grant) in LTE/LTE-A System

FIG. 18 is a diagram illustrating an example of DCI format 0.

In LTE a PUSCH resource is allocated through a UL grant of an eNB.

By transmitting DCI format 0 CRC masked by C-RNTI of a UE through a PDCCH, the LTE UL grant makes a UE to generate uplink data and transmit it according to an instruction of an eNB through receiving the corresponding information.

That is, FIG. 18 and Table 6 represent parameters of DCI format 0.

TABLE 6

| Format 0 (release 8) | Format 0 (release 8) |
|---|---|
|  | Carrier Indicator |
| Flag for format 1A differentiation | Flag for format 0/format 1A differentiation |
| Hopping flag | Hopping flag |
| Resource block assignment (RIV) | Resource block assignment (RIV) |
| MCS and RV | MCS and RV |
| NDI (New Data Indicator) | NDI (New Data Indicator) |
| TPC for PUSCH | TPC for PUSCH |
| Cyclic Shift for DM RS | Cyclic Shift for DM RS |
| UL index (TDD only) | UL index (TDD only) |
| Downlink Assignment Index (DAI) | Downlink Assignment Index (DAI) |
| CQI request (1 bit) | CSI request (1 or 2 bits: 2 bits are multi carrier) |
|  | SRS request |
|  | Resource allocation type |

Herein, the lengths of Hopping flag and RIV may have different lengths according to a system bandwidth as follows.

Hopping Flag
1 (1.4/3/5 Mhz) or 2 (10/15/20 Mhz) bits
Resource Block Assignment
5 (1.4 Mhz), 7 (3/5 Mhz), 11 (10 Mhz), 12 (15 Mhz), 13 (20 Mhz) bits A UL data transmission method in LTE (-A) or 802.16m is briefly described.

The cellular system such as LTE (-A) or 802.16m uses a resource allocation scheme based on an eNB scheduling.

In the system that uses the resource allocation scheme based on an eNB scheduling as such, a UE that has data to transmit (i.e., UL data) requests a resource for transmitting the corresponding data to an eNB before transmitting the data.

The scheduling request of a UE may be performed through a Scheduling Request (SR) transmission to a PUCCH or a Buffer Status Report (BSR) transmission to a PUSCH.

In addition, in the case that a resource for transmitting the SR or the BSR is not allocated to a UE, the UE may request an uplink resource to an eNB through the RACH procedure.

As such, an eNB that receives the scheduling request from a UE allocates the uplink resource that the corresponding UE is going to use to the UE through a downlink control channel (i.e., UL grant message, DCI in the case of LTE (-A)).

In this case, the UL grant transmitted to the UE may indicate which subframe the resource that is allocated to the UE corresponds to by explicit signaling, but may also define an appointed time between the UE and the eNB using the resource allocation for the subframe after a specific time (e.g., 4 ms in the case of LTE).

As such, the case that an eNB allocates a resource after X ms (e.g., 4 ms in the case of LTE) to a UE means that the eNB allocates the resource of UE by considering all of the times for receiving and decoding a UL grant and for preparing and encoding the data to transmit.

DCI Format 3/3A in LTE/LTE-A System

In the case of LTE(-A), DCI format 3/3A may be used for a power control of a PUCCH or a PUSCH.

DCI format 3/3A may be constructed by N TPC commands as represented in Table 7 or Table 8 below.

Here, N may be preconfigured to a UE through an RRC message. Such DCI format 3/3A may transmit information of 2N/N bits length, and is transmitted through a common search space by being CRC masked with TPC-RNTI.

A UE performs a power control for transmitting data to a PUCCH or a PUSCH by receiving a TPC command that corresponds to its own location.

TABLE 7

| Format 3 (release 8) - TPC-RNTI | | |
|---|---|---|
| Field Name | Length (Bits) | Comment |
| TPC command number 1 | 2 | |
| TPC command number 2 | 2 | |
| TPC command number 3 | 2 | |
| ... | | |
| TPC command number N | 2 | The size of N is dependent on the payload size of DCI format 0 for the system BW |

TABLE 8

| Format 3A (release 8) - TPC-RNTI | | |
|---|---|---|
| Field Name | Length (Bits) | Comment |
| TPC command number 1 | 1 | |
| TPC command number 2 | 1 | |
| TPC command number 3 | 1 | |
| ... | | |
| TPC command number N | 1 | The size of N is dependent on the payload size of DCI format 0 for the system BW |

Hereinafter, a procedure for an eNB to send down a PDCCH to a UE will be described.

FIG. 19 is a block diagram illustrating a structure of a PDCCH.

A BS determines a PDCCH format according to DCI to be transmitted to a UE, attaches a CRC to control information, and masks a unique identifier (referred to as a radio network temporary identifier (RNTI)) to the CRC according to an owner or usage of the PDCCH (block 1910).

In the case that the PDCCH is for a specific wireless device, a unique identifier (e.g., cell-RNTI (C-RNTI)) of the UE may be masked to the CRC.

Alternatively, in the case that the PDCCH is for a paging message, a paging indication identifier (e.g., paging-RNTI (P-RNTI)) may be masked to the CRC.

In the case that the PDCCH is for system information, a system information identifier (e.g., system information-RNTI (SI-RNTI)) may be masked to the CRC. In order to indicate a random access response that is a response for transmission of a random access preamble of the UE, a random access-RNTI (RA-RNTI) may be masked to the CRC. In order to indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 1920).

Encoding includes channel encoding and rate matching.

The encoded data is modulated to generate modulation symbols (block 1930).

The modulation symbols are mapped to physical resource elements (REs) (block 1940). The modulation symbols are respectively mapped to the REs.

FIG. 20 illustrates an example of resource mapping of a PDCCH.

Referring to FIG. 20, R0 denotes a reference signal of a 1st antenna, R1 denotes a reference signal of a 2nd antenna, R2 denotes a reference signal of a 3rd antenna, and R3 denotes a reference signal of a 4th antenna.

A control region in a subframe includes a plurality of control channel elements (CCEs). The CCE is a logical allocation unit used to provide the PDCCH with a coding rate depending on a state of a radio channel, and corresponds to a plurality of resource element groups (REGs). The REG includes a plurality of resource elements (REs). According to the relationship between the number of CCEs and the coding rate provided by the CCEs, a PDCCH format and a possible PDCCH bit number are determined.

One REG (indicated by a quadruplet in the drawing) includes 4 REs. One CCE includes 9 REGs.

The number of CCEs used to configure one PDCCH may be selected from {1, 2, 4, 8}. Each element of {1, 2, 4, 8} is referred to as a CCE aggregation level.

A control channel including one or more CCEs performs interleaving in unit of REG, and is mapped to a physical resource after performing cyclic shift based on a cell identifier (ID).

FIG. 21 illustrates an example of distributing CCEs across a system band.

Referring to FIG. 21, a plurality of logically contiguous CCEs is input to an interleaver. The interleaver permutes the sequence of the plurality of input CCEs on an REG basis.

Accordingly, the time/frequency resources of one CCE are physically distributed to a total time/frequency area in the control region of a subframe. As a consequence, while the control channel is configured on a CCE basis, it is interleaved on an REG basis, thereby maximizing frequency diversity and an interference randomization gain.

FIG. 22 illustrates an example of PDCCH monitoring.

In 3GPP LTE, blind decoding is used to detect a PDCCH. Blind decoding is a process of de-masking a cyclic redundancy check (CRC) of a received PDCCH (PDCCH candidate) with a desired identifier to check a CRC error, thereby allowing a UE to identify whether the PDCCH is a control channel of the UE. A UE does not recognize a position in which a PDCCH thereof is transmitted in a control region and a CCE aggregation level or DCI format used to transmit the PDCCH.

A plurality of PDCCHs may be transmitted in one subframe. A UE monitors a plurality of PDCCHs in each subframe.

Here, the monitoring refers to an attempt of a UE to decode a PDCCH according to a monitored PDCCH format.

In 3GPP LTE, a search space is used to reduce load caused by blind decoding. A search space may denote a monitoring set of CCEs for a PDCCH. A UE monitors a PDCCH in a corresponding search space.

A search space is divided into a common search space and a UE-specific search space. The common search space is a space for searching for a PDCCH having common control information, which includes 16 CCEs with CCE indexes of 0 to 15 and supports a PDCCH having a CCE aggregation level of {4, 8}. However, a PDCCH (DCI format 0 and 1A) carrying UE-specific information may also be transmitted to the common search space. The UE-specific search space supports a PDCCH having a CCE aggregation level of {1, 2, 4, 8}.

TABLE 9

| Search Space Type | Aggregation Level (L) | Size (in CCEs) | Number of PDCCH candidates | DCI formats |
|---|---|---|---|---|
| UE-Specific | 1 | 6 | 6 | 0, 1, 1A, 1B, 1C, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 6 | 2 |  |

A size of a search space is determined by Table 9 above, and a different start point of a search space is defined for a common search space and a UE-specific search space. A start point of a common search space is fixed regardless of subframes, while a start point of a UE-specific search space may change by subframe according to an UE ID (e.g., C-RNTI), a CCE aggregation level and/or a slot number in a radio frame. When the start point of the UE-specific search space is in the common search space, the UE-specific search space and the common search space may overlap.

In an aggregation level of L∈{1, 2, 4, 8}, a search space $S^{(L)}_k$ is defined as an aggregation of PDCCH candidates. A CCE that corresponds to PDCCH candidate m of a search space $S^{(L)}_k$ is given as below.

$$L \cdot \left\{ (Y_k + m) \bmod \left\lfloor \frac{N_{CCE,k}}{L} \right\rfloor \right\} + i \qquad \text{[Equation 4]}$$

Here, i=0, 1, ..., L−1, m=0, ..., $M^{(L)}$−1, $N_{CCE,k}$ are total number of a CCE that may be used for a transmission of a PDCCH in a control region of subframe k.

A control region includes an aggregation of CCEs numbered from 0 to $N_{CCE,k}$−1. $M^{(L)}$ is the number of PDCCH candidates in CCE aggregation level L in a given search space. In a common search space, $Y_k$ is set to 0 with respect to two aggregation levels, L=4 and L=8. In a UE-specific search space of aggregation level L, variable $Y_k$ is defined as below.

$$Y_k = (A \cdot Y_{k-1}) \bmod D \qquad \text{[Equation 5]}$$

Here, $Y_{-1} = n_{RNTI} \neq 0$, A=39827, D=65537, k=floor($n_s/2$) and $n_s$ are slot number in a radio frame.

FIG. 23 is a diagram illustrating an example of a logical channel prioritization in the LTE system.

First, data transmitted and received between a UE and an eNB may generate different Data Radio Bearer (DRB) with each other according to a service property, and each DRB may be mapped to a specific Dedicated Traffic Channel (DTCH).

Here, the DRB of LTE may be generated up to maximum 32, and accordingly, DRB IDs may be allocated with values from 1 to 32.

In addition, the DRB transmitted to a DTCH may be mapped to logical channel IDs (LCIDs) from 3 to 10, and a DRB ID may be mapped to an LCID for a DTCH.

Furthermore, maximum 8 DTCHs that may be generated in LTE may be mapped to a logical channel group (LCG)

depending on a service type of a DRB, and this means that an LCID for one or more DTCHs may be mapped to an LCG ID.

Here, an LCG ID is a unit that a UE reports a Buffer Status to an eNB.

The data transmitted to a DTCH logical channel is mapped to a downlink share channel (DL-SCH) or an uplink share channel (UL-SCH) of a MAC layer, and this is transmitted by being mapped to a PDSCH or a PUSCH of a PHY layer, respectively.

In this case, a MAC layer may transmit the data generated from different DTCH logical channel that may be transmitted and received to a specific UE by multiplexing it with a single physical resource.

According to it, multiplexed data are constructed as a single transport block and transmitted in the same resource, and the same HARQ process is performed.

LTE provides the logical channel prioritization function that a UE may transmit data having high priority more quickly by providing a priority for a logical channel with respect to an UL data of the UE.

This set a Prioritized Bit Rate (PBR) for each logical channel in order to prevent the starvation phenomenon of data transmitted from a logical channel of which priority is low, and accordingly, data of which priority is high can be transmitted using a resource of higher ratio.

As shown in FIG. 23, data of a specific DRB is mapped to a single logical channel, and has a PRB according to the priority. After data as much as the PRB which is set is allocated to a resource according to the priority, the data is transmitted by applying all of the allocated resources.

In this case, the data generated from an SRB may have a PRB infinity value, and this is designed for transmitting all of the data that are intended to be transmitted at a time by using the allocated resources.

CRC Calculation in LTE/LTE-A

Currently, in LTE(-A), as a method for detecting an error of data, CRC is attached to a transport block and transmitted.

It is defined that 16-bit CRC is used by using an RNTI identifier for error detection in a PDCCH and 24-bit CRC is used for a data transmission.

More specifically, it is defined that CRC of CRC24A type is used for TB CRC and CRC of CRC24B type is used for code block CRC.

FIG. 24 illustrates an example of a signal processing procedure of a UL shared channel which is a transport channel in a wireless communication system to which the present invention may be applied.

Hereinafter, the signal processing procedure of the UL shared channel (hereinafter, "UL-SCH") may be applied to one or more transport channels or control channel types.

Referring to FIG. 24, a UL-SCH forwards data to a coding unit in a form of Transport Block (TB) once in every transmission time interval (TTI).

CRC parity bits $p_0, p_1, p_2, p_3, \ldots, p_{L-1}$ are attached to bits $a_0, a_1, a_2, a_3, \ldots, a_{A-1}$ of a transport block forwarded from a higher layer (step, S120). In this case, A is the size of the transport block and L is the number of parity bits.

The parity bits are generated by one of the following cyclic generator polynomials.

gCRC24A(D)=[D24+D23+D18+D17+D14+D11+D10+ D7+D6+D5+D4+D3+D+1] and;
gCRC24B(D)=[D24+D23+D6+D5+D+1] for a CRC length L=24 and;
gCRC16(D)=[D16+D12+D5+1] for a CRC length L=16.
gCRC8(D)=[D8+D7+D4+D3+D+1] for a CRC length of L=8.

The input bit to which CRC is attached is as represented as $b_0, b_1, b_2, b_3, \ldots, b_{B-1}$. In this case, B represents a bit number of a transport block including CRC.

$b_0, b_1, b_2, b_3, \ldots, b_{B-1}$ is segmented into several code blocks (CB) depending on a TB size, and CRC is attached to the segmented several CBs (step, S121).

After the code block segmentation and CRC attachment, a bit is as represented as $c_{r0}, c_{r1}, c_{r2}, c_{r3}, \ldots, c_{r(K_r-1)}$. Herein, r is the number (r=0, . . . , C−1) of a code block, and $K_r$ is a bit number according to r.

Subsequently, channel coding is performed (step, S122). A output bit after the channel coding is as represented as $d_{r0}^{(i)}, d_{r1}^{(i)}, d_{r2}^{(i)}, d_{r3}^{(i)}, \ldots, d_{r(D_r-1)}^{(i)}$. In this case, i is a stream index which is coded, and may have a value of 0, 1 or 2. $D_r$ represents a bit number of $i^{th}$ coded stream for code block r. r is the number (r=0, . . . , C−1) of a code block, and C represents total number of code blocks. Each code block may be coded by turbo coding, respectively.

Subsequently, rate matching is performed (step, S123). After going through the rate matching, the bit is as represented as $e_{r0}, e_{r1}, e_{r2}, e_{r3}, \ldots, e_{r(E_r-1)}$. In this case, r is the number (r=0, . . . , C−1) of a code block, and C represents total number of code blocks. $E_r$ represents the number of bits which are rate matching of $r^{th}$ code block.

Subsequently, a concatenation between code blocks is performed again (step, S124). After the concatenation of performed, the bit is as represented as $f_0, f_1, f_2, f_3, \ldots f_{G-1}$. In this case, G represents total number of coded bits for a transmission. When control information is multiplexed with a UL-SCH transmission, the bit number used for control information transmission is not included.

Meanwhile, when control information is transmitted in a PUSCH, channel coding is independently performed for each of CQI/PMI, RI, ACK/NACK that are control information (steps, S126, S127 and S128). Since different coded symbols are allocated for each type of the control information, each of the types of the control information has different coding rates.

In Time Division Duplex (TDD), two types of modes, ACK/NACK bundling and ACK/NACK multiplexing, are supported by higher layer configuration as ACK/NACK feedback mode. For the ACK/NACK bundling, ACK/NACK information bit is configured by 1 bit or 2 bits, and for the ACK/NACK multiplexing, ACK/NACK information bit is configured by 1 bit to 4 bits.

In step S124, after the step of concatenation between code blocks, multiplexing of the coded bits $f_0, f_1, f_2, f_3, \ldots, f_{G-1}$ of UL-SCH data and the coded bits $q_0, q_1, q_2, q_3, \ldots, q_{N_L \cdot Q_{CQI}-1}$ of CQI/PMI is performed (step, S125). A result of multiplexing of data and CQI/PMI is as represented as $g_0, g_1, g_2, g_3, \ldots, g_{H'-1}$. In this case, $g_i(i=0, H'-1)$ represents a column vector having a length of $(Q_m \cdot N_L)$. Herein, H=(G+ $N_L \cdot Q_{CQI}$) and H'=H/$(Q_m \cdot N_L)$. $N_L$ represent the number of layer in which a UL-SCH transport block is mapped, and H represents the number of total coded bits which is allocated for UL-SCH data and the CQI/PMI information to $N_L$ transport layers to which a transport block is mapped.

Subsequently, the multiplexed data, CQI/PIM, separately channel coded RI and ACK/NACK are channel-interleaved, and an output signal is generated (step, S129).

As shown in FIG. 24, TB of a predetermined length or longer may be segmented, and the segmented block is called a code block. That is, TB of a predetermined length or shorter is transmitted in which only TB CRC (CRC24A) is attached, but in the TB of a predetermined length or longer, TB to which TB CRC (CRC24B) is attached is segmented again, and transmitted by attaching code block CRC (CRC24B) to each code block.

FIG. 25 is a diagram illustrating a time until a UE transmits actual data through 5 step scheduling request procedure using PUCCH SR resource.

As shown in FIG. 25, a UE may transmit actual uplink data after about 17 ms from the time of transmitting an SR signal.

In this case, the SR resource allocated to the UE may be allocated to a PUCCH with a specific period, minimum 1 ms to maximum 80 ms.

Here, in the case that the SR of 1 ms period is allocated to the corresponding UE, an average time for the UE to wait for the PUCCH resource for an SR transmission is 0.5 ms, and the delay time until the data transmission through a scheduling request to an eNB takes 17.5 ms.

In the case that a UE has an uplink resource allocated from an eNB beforehand, the UE may transmit the resource request for newly generated data by using the resource allocated beforehand.

Alternately, the UE may request an additional resource by transmitting a BSR together with the data transmitted with the resource allocated beforehand.

In this case, as shown in FIG. 26, the delay of 9 ms occurs until transmitting uplink data after a UE request a BSR.

In the case that there is no PUCCH SR resource or PUSCH resource that the UE is allocated from the eNB or the uplink is not synchronized, the UE may request the resource for the newly generated data using the RACH procedure.

That is, as shown in FIG. 27, the delay of 17 ms occurs until the UE transmits uplink data from the time of transmitting the RACH preamble to the eNB.

In this case, the PRACH resource that is available to transmit the RACH preamble may be configured with a specific period for each cell. Assuming the PRACH resource has the period of minimum 1 ms, the data transmission delay of average 17.5 ms may occur.

As described in FIG. 25 to FIG. 27, the UE may transmit actual data by undergoing the delay of minimum 9 ms to maximum 17.5 ms for transmitting uplink data.

Accordingly, the eNB allocates an optimal resource to each UE in a channel environment, and accordingly, the resource efficiency may be maximized, but the transmission delay occurs.

The requirement of 5G is increasing for supporting various real time application services such as health care, traffic safety, disaster safety, remote medical control, and so on.

Accordingly, 5G sets it as a goal to construct an ultra low latency system that has an extremely short response time to the extent that a user is unable to notice even in the case that the tactility information which is mostly sensitive to the delay time among five senses of a human is provided through an internet (target delay: E2E or Radio 1 ms).

Delay of a data transmission is needed to be minimized in order to provide such a 5G communication service, but a data transmission of a current system is designed to cause delay additionally as below.

Downlink Data Transmission Delay
Connected UE: 0 ms (no delay)
Dormant UE: Average 1 ms to 280 ms delay occurs depending on DRX cycle set to a UE (short DRX cycle: 2~640 ms, long DRX cycle: 10~2560 ms).
Idle UE: Average 160 ms, 280 ms+initial access delay occurs depending on paging DRX cycle set to a UE (paging cycle: 320~2560 ms, initial access: 50 ms~100 ms (LTE-A: 50 ms/LTE: 100 ms)).

Uplink Data Transmission Delay
Synchronized & dormant UE: 17.5 ms delay occurs (5-step SR).
Unsynchronized UE: 17.5 ms delay occurs (SR through RACH).
Connected UE to which uplink resource is allocated: 9 ms (Data is transmitted through BRS transmission)

As such, various time delays may occur in transmission/reception of data for a UE depending on the state of UE, and particularly, delay of downlink data reception may occur with various lengths for a UE in a dormant or idle state.

However, this is one of methods for decreasing power consumption of a UE, and it is required to examine closely a relationship between data reception delay and power consumption.

However, for the data transmission delay in an uplink data transmission, it is identified that additional delay is bound to occur since a UE uses the data transmission scheme based on an eNB scheduling although the UE is able to transmit data whenever it is required.

A service which may prevent a secondary accident or respond an emergency situation rapidly is expected to be provided as a main low latency service of future 5G communication, by quickly notifying information of an accident or state that may occur due to a specific event on an unpredictable time from a various end users such as a human, a machine (vehicle or sensor), or the like to an eNB or a neighboring UE/user.

Such a low latency service makes it possible to perform a subsequent procedure by transmitting mainly uplink data quickly.

Owing to this, a fast transmission of unlink data which is an initiation step of a corresponding service s one of important factors that influences overall service delay.

Due to the reasons above, in order to support a low latency service of a new 5G communication, it is considered that delay in an uplink data transmission is a factor that should be decreased necessarily.

Hereinafter, a fast UL data transmission method proposed in the present disclosure will be described, which is to support a low latency service in a wireless communication system such as 5G.

Particularly, as shown in FIG. 28, the present disclosure provides a method for transmitting a new UL data such as urgent data quickly by using a retransmission resource that a UE is allocated with in advance.

In the case that a UE transmits UL data to an eNB using a retransmission resource, the present disclosure provides a method for transmitting an indicator indicating whether the UL data is retransmission data or new data together.

The indicator may be represented as a New Data Indicator (NDI) field (or information), and hereinafter, the indicator is represented as 'NM', 'NDI field' or 'NDI information'.

FIG. 28 is a diagram illustrating an example of a method for transmitting UL data quickly by using a retransmission resource proposed in the present disclosure.

Referring to FIG. 28, when an urgent event occurs in N=10 subframe (SF) of (step, S2810), a UE may preempt a retransmission resource in N=12 SF (with respect to initial UL data transmitted in N=4 SF) and may transmit NDI information in relation to PHY layer and urgent data together through the preempted retransmission resource (step, S2820).

A method proposed in the present disclosure may have the configuration as represented in 1 to 3 below.

The configuration (NDI transmission on a PUSCH and NDI transmission on a PUCCH) of 1 and 2 below defines NDI, and represents a method for transmitting it. And the configuration of 3 below represents an operation method of a UE and an eNB in relation to NDI transmission/reception.

1. New Data Indicator (NDI) Transmission on a PUSCH
   (1) NDI transmission method through a PHY header definition
   (2) NDI transmission method using a new CRC type
   (3) NDI transmission method using UL-SCH data and multiplexing of NDI signaling in a PUSCH resource 3. Operational Procedure of a UE and an eNB
   (1) The case that HARQ is not performed for urgent data or preemption data
   (2) The case that HARQ is performed for urgent data or preemption data That is, in the case that a specific UE (e.g., urgent UE, etc.) is required to transmit urgent data using the configuration of 1 to 3 above, a method proposed in the present disclosure provides a method for transmitting urgent data quickly to an eNB using the resource (e.g., retransmission resource) allocated in advance to the UE itself.

In the existing case, in order to prevent starvation phenomenon of data of which priority is low, a UE distributes an amount of data with different ratio (Prioritized Bit Rate; PBR) according to priorities of data (DRB or logical channel) arrived in a buffer for a resource allocated to the UE itself, and transmits it to an eNB after multiplexing it in the same PHY resource.

That is, FIG. 28 is a diagram illustrating a resource preemption procedure for an initial data transmission.

As shown in FIG. 28, in the case that an urgent event occurs after a UE receives a UL grant for an initial data transmission from an eNB, the UE transmits urgent data preferentially using a resource allocated through the received UL grant than data of which priority is low.

However, as shown in FIG. 28, in the case that a UE receives a UL grant from an eNB, urgent data arrives at a buffer after the UE transmits initial data to the eNB, and the UE is allocated with a retransmission resource for performing HARQ from the eNB owing to a failure of the initial data transmission, although the UE is allocated with the retransmission resource, the UE is unable to transmit the urgent data using the allocated retransmission resource.

The reason is because the exiting HARQ technique is designed to obtain a coding gain by transmitting combined bits as the same as data used in an initial transmission (or different redundancy version of the same combined bits).

Accordingly, in the UL HARQ process using synchronous HARQ, it is impossible to transmit the combined bits for different data as a retransmission resource for a specific HARQ process.

When a UE receives NACK from an eNB for data transmitted to the eNB, the current LTE(-A) defines that the UE may perform a retransmission for initial data to the eNB in the SF after 8 ms and after transmitting the initial data.

That is, the synchronous HARQ process is a method of using eight HARQ processes with being synchronized with ACK/NACK without HARQ process ID (PID) signaling.

Accordingly, in the synchronous HARQ process, a retransmission may be performed by using the resource allocated for an initial data transmission without any change (Non-adaptive HARQ) or being newly allocated (Adaptive HARQ) with a UL grant together with receiving NACK.

FIG. 29 is a diagram illustrating a problem that may occur in a method for transmitting urgent data by preempting a retransmission resource.

As shown in FIG. 29, when a UE transmit urgent data to an eNB through a retransmission resource in N=12 SF (step, S2910), the eNB performs HARQ combining of different data, and is unable to receive data transmitted by the UE (step, S2920).

That is, HARQ error occurs for HARQ process ID 0 in relation to an initial data transmission of a UE.

In a future 5G technique, owing to an advent of a new low latency service, needs for transmitting urgent data are increasing.

Therefore, according to a method for transmitting new data using a resource allocated for a retransmission proposed in the present disclosure, data of a UE may be transmitted quickly to an eNB, and consequently, delay of data transmission may be decreased.

That is, as shown in FIG. 29 described above, in the case that an urgent event (or urgent data) occurs after a UE receives a transmission failure indicator (HARQ NACK) from an eNB, the present disclosure provides a method for defining a new data indicator that enables the UE to be able to transmit urgent data, and the like by using the resource allocated for a retransmission.

A UE transmits an indicator for transmitting new data together with new data, not retransmitting a previous data using a resource which is already allocated from an eNB.

Accordingly, an eNB that receives new data with the indicator does not perform HARQ combining the new data with the data stored in a HARQ buffer such that a UE may transmit UL data quickly using a retransmission resource.

Hereinafter, among the configurations proposed in the present disclosure, a method for transmitting a New Data Indicator (NDI) on a PUSCH and the related procedure of a UE and an eNB will be described in detail with reference to drawings.

First, a method for transmitting NDI information on a PUSCH is described for transmitting urgent data using a retransmission resource.

1. New Data Indicator (NDI) on the PUSCH

This method represents a method for New Data Indicator (NDI) information indicating whether the data transmitted on the PUSCH is a retransmission data (for previous data) or a new data like an urgent data, and the like to be transmitted together with UL data in a PUSCH resource.

The 'previous data' used in the present disclosure is a term used for the convenience for distinguishing it from 'new data' like urgent data, and the like, and may mean UL data or initial UL data that a UE transmits to an eNB before an urgent event occurs.

This method may include (1) a method for transmitting NDI information through PHY header definition, (2) a method for transmitting NDI information using a new CRC type and (3) a method for transmitting NDI information using UL-SCH data in a PUSCH resource and multiplexing of NDI signaling.

(1) First Embodiment: A Method for Transmitting NDI Through PHY Header Definition A first embodiment represents a method for newly defining PHY header including NDI information and transmitting it together with UL data of a UE.

FIG. 30 is a diagram illustrating an example of a MAC PDU format including PHY header proposed in the present disclosure.

The PHY header 3010 is preferred to be located in forefront of MAC PDU 3000.

In addition, the information(s) included in the PHY header is defined as the information to be forwarded to a PHY layer again after performing Transport Block CRC check and decoding on it.

As shown in FIG. 30, a MAC PDU includes a MAC header 3020, a MAC SDU 3030 and the newly defined PHY header 3010.

The MAC PDU may be mapped to a specific physical resource together with a CRC.

In addition, the PHY header includes at least one of a PHY header Indicator (PHI) field 3011 or a New Data Indicator (NDI) field 3012.

The PHI indicates an indicator representing whether the NDI field is included in a MAC PDU (or an indicator representing whether the NDI field is transmitted with a MAC PDU or not).

As an example, in the case that a value of the PHY header indicator is set to '0', a MAC PDU may represent that it does not include the NDI field or a MAC header is located just behind the PHY header indicator field.

In the case that a value of the PHY header indicator is set to '1', a MAC PDU may represent that it includes the NDI field or the NDI field is added after the PHY header indicator field (refer to FIG. 30).

The PHY header indicator field may be used for minimizing signaling overhead owing to the PHY header in the case that there are one or more types of information transmitted to the PHY header.

However, the PHY header indicator field may be omitted depending on a situation.

In addition, in the case that the PHY header indicator field is not included in the PHY header, it may be defined that the PHY header includes the NDI field always.

It is preferable that the NDI field proposed in the present disclosure is transmitted through PHY control information.

Accordingly, the NDI field transmitted as a MAC PDU is forwarded to a PHY layer after being decoded.

In the case that the NDI field is set to a value representing new data, an eNB may discard or separately store a previous data (or coded bit) stored with respect to a HARQ process ID.

According to the first embodiment, a receiver side (e.g., eNB) performs HARQ process after identifying the PHY header included in a MAC PDU.

That is, according to the first embodiment, after identifying that the data transmitted together with the PHY header through the PHY header is the retransmission data first, the HARQ combining should be performed with a previous data failed to transmit.

Accordingly, in the first embodiment, an independent decoding is additionally performed for data including the PHY header before performing the HARQ combining, and accordingly, decoding overhead is additionally occurred such that an eNB receives the retransmission data from a UE.

Here, it is preferable to assume that urgent data transmitted by a UE is successfully received in an eNB with high probability of 99.9999% or higher.

FIG. 31 is a flowchart illustrating an example of a decoding method of a transport block including a PHY header proposed in the present disclosure.

Referring to FIG. 31, an eNB receives a transport block from a UE through a retransmission resource region (allocated to the UE) (step, S3110).

The transport block indicates a MAC PDU including the PHY header described above.

Later, the eNB checks whether an NDI field is included through the PHY header indicator field included in the PHY header.

In the case that the NDI field is included, the eNB checks whether the transport block is new data like urgent data (or Low Latency Radio (LLR) data) and the like or a retransmission data with respect to UL data (previous data) previously transmitted through the NDI field (step, S3120).

In the case that the transport block is new data like urgent data and the like, the eNB performs the procedure through steps S3121 to S3124.

That is, after the eNB decodes the transport block through a Turbo Decoder (step, S3121), the eNB performs a CRC check for the transport block (step, S3122).

Depending on whether the CRC check of step S3122 is succeeded (step, S3123), the eNB performs the following procedures.

In the case that the eNB succeeded to CRC check in step S3123, the eNB transmits HARQ ACK to the UE, and discard (HARQ buffer flush) or separately store the code bits stored in the HARQ buffer in relation to the corresponding HARQ process ID (step, S3124).

In the case that the eNB fails to CRC check in step S3123, the eNB transmits HARQ NACK to the UE (step, S3170).

As a result of checking in step S3120, in the case that the transport block is the retransmission data, the eNB performs the existing HARQ process (procedure through steps S3130 to S3170).

That is, the eNB performs HARQ combining of the initial transport block and the retransmitted transport block (step, S3130).

Later, after the eNB performs (turbo) decoding for the transport block combined in step S3130 through the turbo decoder (step, S3140), the eNB CRC checks for the corresponding transport block or whether a maximum retransmission count is exceeded (steps S3150 and S3160).

In the case that the CRC check is successful, the eNB performs step S3124. That is, the eNB transmits HARQ ACK to the UE, and flushes the HARQ buffer in relation to the corresponding HARQ process ID.

In the case that CRC check is failed and the maximum retransmission count is not exceeded, the eNB performs step S3170. That is, the eNB transmits HARQ NACK to the UE.

(2) Second Embodiment: A Method for Transmitting NDI Using a New CRC Type

Next, a second embodiment in which NDI information is transmitted using a new Cyclic Redundancy Check (CRC) type will be described.

The second embodiment represents a method for transmitting the NDI information indicating whether it is a retransmission data or a new data by using different CRC bits from each other with respect to the retransmission data and newly transmitted data (e.g., urgent data).

Previously, 24-bit CRC is used for performing CRC check.

The 24-bit CRC includes two types (CRC 24A and CRC 24B) as described above.

CRC 24A is used for a transport block CRC and CRC 24B is used for a code block CRC.

The second embodiment newly defines CRC 24A' or CRC 24B' for transmitting a New Data Indicator (NDI) that represents it is new data.

That is, in order to transmit new data using a retransmission resource, a UE may transmit the new data by attaching CRC defined as CRC 24A' or CRC 24B' to a transport block (TB) or a code block (CB) for the new data to an eNB.

In the case that TB segmentation occurs for the data transmitted by a UE and data is generated in a CB unit, the UE should notify NDI information to an eNB by using CRC 24B' instead of CRC 24A'.

In the case that TB segmentation does not occur for the data transmitted by a UE (in the case that a TB is transmitted without any change), the UE should notify NDI information using CRC 24A' for transmitting new data.

FIG. 32 illustrates a CRC check procedure in the case that TB segmentation does not occur for the data transmitted by a UE.

Particularly, FIG. 32 shows CRC check process of the case that TB segmentation does not occur for data transmitted by a UE.

Referring to FIG. 32, an eNB receives UL data from a UE through a retransmission resource allocated to the UE (step, S3210).

Later, the eNB determines whether CRC check is performed with CRC 24A (step, S3220).

In the case that the eNB does not perform CRC check with CRC 24A, the eNB performs HARQ combining of an initial TB stored in HARQ buffer and a retransmission TB (step, S3230).

Later, the eNB performs (turbo) decoding of a Combined Transport Block through a turbo decoder (step, S3240), and then, performs CRC check with CRC 24A (step, S350).

When the CRC check with CRC 24A is succeeded, the eNB identifies the data received through a retransmission resource is the retransmission data (steps, S3260 and S3270).

That is, the eNB identifies that the retransmission data is successfully received from the UE, transmits HARQ ACK to the UE, and flushes the corresponding HARQ buffer.

However, when the CRC check with CRC 24A is failed, the eNB performs CRC check with CRC 24A' through steps S3221 and S3222 (steps, S3221 and S3222).

The reason why step S3222 is performed is because it is unable to know whether the cause of failure of CRC check with CRC24A is due to the new data or the retransmission data reception error.

That is, the eNB performs (turbo) decoding of a TB transmitted without HARQ combining with an initial transport block through a turbo decoder (step, S3221).

Later, the eNB performs CRC check of decoded TB with CRC 24A' (step, S3222).

Then, when the CRC check in step S3222 is succeeded, the eNB identifies that the data transmitted through the TB is new data, and forwards the corresponding data to a higher layer (steps, S3223 and S3224).

However, when the CRC check in step S3222 is failed, the eNB regards the data transmitted through the TB as the retransmission data and transmits HARQ NACK to the UE, and requests to retransmit the corresponding data (steps, S3223 and S3225).

The retransmission request for the corresponding data is performed within the range that does not exceed a maximum retransmission count.

As described above, it is preferable that the second embodiment is applied to the case that new data is transmitted to an eNB from a UE with high reliability and HARQ is not applied.

In the case that an error occurs for the new data that the UE transmits to the eNB, owing to HARQ combining of wrong data, the HARQ performance in a receiver side (e.g., eNB) may be decreased.

In addition, it is understood that the second embodiment may be identically applied to the case that TB segmentation occurs and CRC check is performed with a unit of code block (CB).

In this case, the CRC attached to a CB is CRC 24B' instead of CRC 24B. That is, by attaching CRC 24B' to a CB, it is notified that the corresponding CB is a new CB, not a retransmission CB.

In the case of a transmission in a unit of CB, the CRC attached to a TB is CRC 24A', not CRC 24A.

As such, since a unit of HARQ combining acts as a CB in a transmission of a unit of CB, CRC 24B' may be used.

However, when combining and CRC check of CB unit operate in serial for n number of CBs, in the case that the CRC check with CRC 24B' is successfully performed for even one of n number of CBs, the corresponding TB may be determined to be a TB for new data.

In addition, in the second embodiment, it is exemplified that the CRC check (CRC 24A or CRC 24B) for the retransmission data is performed first, and then the CRC check (CRC 24A' or CRC 24B') for new data is performed, as described in FIG. 32, but it is also available that the CRC check (CRC 24A' or CRC 24B') for new data is performed first, and then the CRC check (CRC 24B) for the retransmission data is performed for the case that the CRC check for new data is failed, as shown in FIG. 33.

FIG. 33 is a flowchart illustrating another example of a method for decoding a transport block through new CRC check proposed in the present disclosure.

FIG. 33 is a diagram illustrating the case that the CRC check for new data is performed first, and particularly, TB segmentation occurs and the CRC check is performed in a unit of CB.

That is, an eNB performs (turbo) decoding through a turbo decoder for the TB received from a UE, and then, performs CRC check of the TB with CRC 24B' (step, S3310).

In the case that the CRC check with CRC 24B' is failed, the eNB performs CRC check of the TB with CRC 24B (step, S3320).

Accordingly, in the case that the CRC check of the TB with CRC 24B' is succeeded, the eNB knows that the corresponding TB is for new data, and in the case that the CRC check of the TB with CRC 24B is succeeded, the eNB knows that the corresponding TB is for the retransmission data.

In the case that a probability of transmitting retransmission data using a retransmission resource is high in the second embodiment, the method as described in FIG. 32 may be efficient.

However, in the second embodiment, since a decoding time for new data is added, in the case of a transmission of data sensitive to data transmission delay, it may be preferable to use the method described in FIG. 33.

Otherwise, in the case that it is hard to divide retransmission data after HARQ combining for initial data and retransmission data is performed in an eNB, it may also preferable to use the method described in FIG. 33.

(3) Third Embodiment: A Method for Transmitting NDI Using UL-SCH Data in a PUSCH Resource and Multiplexing of NDI Signaling Next, a third embodiment that NDI information is transmitted using multiplexing of UL-SCH data and NDI signaling (information) in a PUSCH resource will be described.

The third embodiment provides a method for transmitting control information (e.g., NDI information) indicating whether it is new data or retransmission data through a PUSCH resource that a UE is allocated by an eNB by multiplexing it while transmitting UL-SCH data.

LTE(-A) defines that CQI/PMI, HARQ ACK/NACK or RI information is transmitted by being multiplexed with UL-SCH data before Discrete Fourier Transform (DFT)-spreading is performed.

As a similar method to this, the third embodiment provides a method for transmitting an indicator (NDI information) indicating whether data transmitted using a retransmission resource is retransmission data or new data with being multiplexed with UL-SCH data.

As shown in FIG. 34 (FIG. 34a and FIG. 34b), an eNB may allocate a specific RE in a PUSCH resource allocated to a UE for the NDI information.

The UE does not transmit UL-SCH data with the RE allocated for the NDI.

In addition, the UE may receive the resource region in which the NDI is allocated through higher layer signaling (e.g., RRC/MAC) semi-statically or may be dynamically allocated through a UL grant.

FIG. 34 is a diagram illustrating an example of a method for mapping a resource element (RE) for NDI proposed in the present disclosure.

That is, FIG. 34 shows an example of a method for multiplexing NDI and UL-SCH data.

Particularly, FIG. 34a shows an example that each of four REs of NDI information is allocated to 0, $6^{th}$, $7^{th}$ and $13^{th}$ symbols 3410 of a lowest subcarrier index of a PUSCH resource, respectively.

FIG. 34b shows an example that four REs are allocated to $2^{nd}$, $4^{th}$, $9^{th}$ and $11^{th}$ symbols 3420 of a center subcarrier index of a PUSCH resource, respectively.

As shown in FIG. 34, the RE resource allocated for CQI/PMI, HARQ ACK/NACK and RI should not be overlapped with the RE resource allocated for the NDI.

In the third embodiment, all types of NDI may be allocated for resource regions that may be multiplexed with UL-SCH data.

In addition, in the third embodiment, the NDI may be transmitted with being multiplexed with HARQ ACK/NACK transmitted in the existing PUSCH region.

Table 10 below is a table defining a method for distinguishing HARQ ACK/NACK from NDI by using an orthogonal sequence when the NDI is transmitted with being multiplexed with HARQ ACK/NACK.

TABLE 10

| Index | Sequence Index | Orthogonal Sequence |
|---|---|---|
| HARQ A/N | 0 | [+1, +1, +1, +1] |
| NDI | 1 | [+1, −1, +1, −1] |

2. UE and eNB Operation

Hereinafter, a method for performing an operation of a UE and an eNB according to whether to perform HARQ for urgent data or preemption data will be described in more detail based on the contents described above.

First, in the case that HARQ is not performed for urgent data or preemption resource, an operation of a UE and an eNB in relation to UL data transmission/reception using a retransmission resource will be described.

In the case that HARQ is not performed for urgent data or preemption data, a UE transmits urgent data using a retransmission resource and performs a retransmission for the previous data which is unable to be transmitted owing to an urgent data transmission in an SF after 8 ms.

That is, while an eNB stores data received with respect to the corresponding HARQ process ID in advance in a HARQ buffer through NDI information, the eNB receives retransmission data unable to receive after 8 ms from an urgent data transmission time of the UE.

The eNB performs HARQ combining between the data stored in the HARQ buffer and retransmission data received after 8 ms, and transmits HARQ response (ACK/NACK) to the corresponding UE.

In this case, the eNB transmits HARQ NACK indicating that retransmission data reception for the corresponding HARQ process ID is failed to the UE, but does not transmit the HARQ ACK/NACK for a new data reception, and accordingly, the UE may transmit retransmission data to the eNB by using a retransmission resource after 8 ms from the urgent data transmission time of the UE.

FIG. 35 is a diagram illustrating an example of a HARQ operation method in the case that HARQ process is not performed for a UL data transmission through a preemption resource proposed in the present disclosure.

In FIG. 35, assuming that UL data that a UE transmits using a preemption resource is transmitted with high transmission success probability, the HARQ process for UL data transmitted using the preemption resource may be omitted.

At this time, the UE may receive HARQ NACK from an eNB for the data transmitted with the preemption resource.

In this case, the UE identifies that the received HARQ NACK is transmitted as a result of data reception failure for HARQ process ID 0 being performed already.

At this time, the UE may be newly allocated with a retransmission resource through a UL grant transmitted with the HARQ NACK or may retransmit data for HARQ process ID 0 that is intended to retransmit in the same position as a UL resource initially allocated in non-adaptive scheme.

Next, when HARQ is performed for urgent data or preemption resource, an operation of a UE and an eNB in relation to UL data transmission/reception using a retransmission resource will be described.

In the case that HARQ is performed for urgent data or preemption resource, as soon as an eNB receives new data transmitted with NDI information, the eNB discards data stored in a HARQ buffer and performs HARQ process for the new data.

FIG. 36 is a diagram illustrating an example of a HARQ operation method in the case that HARQ is performed for new data transmitted using a retransmission resource proposed in the present disclosure.

Referring to FIG. 36, a UE transmits new data to an eNB together with NDI information through the methods described above in N=8 SF (step, S3610).

Later, the eNB discards data previously received stored in a HARQ buffer, and when a reception of the new data is failed, transmits a new UL grant for retransmitting the new data while transmitting PHICH NACK to the UE (steps, S3620 and S3630).

Here, the data corresponding to PID=0 in N=16 SF indicates new data, not data previously transmitted.

Later, the UE retransmits the new data to the eNB based on the new UL grant (step, S3640).

FIG. 37 is a diagram illustrating an example of a HARQ operation method in the case that HARQ is performed for new data transmitted using a retransmission resource proposed in the present disclosure.

Different from FIG. 36, an eNB changes the HARQ process ID in relation to previous data for retransmitting the previous data to other HARQ process ID, instead of discarding the previous data received from a UE (before an urgent event occurs), and accordingly, the eNB may newly allocate a resource for retransmitting the previous data and is able to perform a retransmission of the previous data.

Here, in order to change the HARQ process ID to other HARQ process ID, the other HARQ process ID should be empty.

In the case that the other HARQ process ID is not empty, the eNB may stand by (or wait) until the other HARQ process ID becomes empty.

Referring to FIG. 37, the eNB identifies that the eNB fails to receive the retransmission data transmitted with PID 0 through a reception of NDI information from a UE.

Accordingly, the eNB identifies whether there is an empty HARQ process ID (PID) of the UE first. In the case that there is an empty HARQ PID of the UE, the eNB may transmit a new UL grant for notifying that the HARQ process for PID 0 is switched (or changed) to other HARQ process ID (step, S3710).

That is, in the case that the eNB identifies that the NDI information of the UE transmitted in N=8 SF and the data (data transmitted by the UE in N=0 SF) received previously according to urgent data are failed to transmit in N=10 SF, the eNB notifies that PID of the data previously received is changed to PID=6 to the UE by transmitting a new UL grant to the UE.

Accordingly, the UE may perform a retransmission of the previous data corresponding to PID=6 in N=14 SF, and also perform a retransmission of urgent data corresponding to PID=0 in N=16 SF.

As shown in FIG. 37, the method of notifying that PID is switched from '0' to '6' may include (1) a method of defining previous PID field in a UL grant (method 1) and (2) a method of transmitting a UL grant and previous PID through a MAC PDU (method 2).

First, method 1 is a method of newly defining a previous PID field indicating a HARQ process ID in relation to previous data in a UL grant.

In the case that UL HARQ operates as synchronous HARQ, by newly defining a previous PID field in a UL grant, it may be indicated that data which is transmitting with the previous PID (PID 0) is changed to a PID (PID 6) for the resource indicated by the UL grant.

In the case that it is hard to newly define a previous PID field in the UL grant, method 2 below may be used.

Method 2 is a method defining a new MAC PDU or a MAC control element (CE) for transmitting the previous PID value.

That is, according to method 2, a new MAC PDU or a MAC CE including the previous PID is transmitted together with a UL grant transmission, and accordingly a UE may continue to perform a transmission for the previous data.

In summary, in the case that an urgent event occurs on a UE and the UE is required to transmit an urgent data, the present disclosure provides a method for transmitting the urgent data using a resource allocated to the UE itself.

Previously, a UE was able to transmit data more quickly by occupying a resource of which priority is high according to uplink data prioritization in the UE by using the resource allocated to the UE itself.

However, in the case that a UE transmit a different data from an initial transmission using a HARQ retransmission resource, as described above, a problem that a HARQ process does not operate properly may occur.

The retransmission resource of the UE is also a resource that an eNB allocates to the UE in order to transmit a data, but even in the case that data of which priority is high is generated in the UE, the UE may transmit the abruptly generated data with being allocated with a new resource only after waiting for retransmission of all of the previous data being completed, owing to the reason described above.

As such, in the case that a HARQ retransmission is performing on the time when the urgent data is generated, long time delay may occur for a user equipment to perform a resource request for an urgent data transmission.

In the worst case, in the case that HARQ retransmission is generated as much as the maximum retransmission count and all (8 for LTE) HARQ processes are performing, a UE is able to be newly allocated with a resource for the urgent data after maximum 32 ms.

However, by using the method proposed in the present disclosure, the data transmission in which delay time may require maximum 32 ms may be performed within 1 to 3 ms, and there is an effect of transmitting urgent data more quickly and safely.

General Apparatus to which the Present Invention May be Applied

FIG. 38 illustrates a block diagram of a wireless communication apparatus to which the methods proposed in the present disclosure may be applied.

Referring to FIG. 38, the wireless communication system includes a base station (eNB) 3810 and a plurality of user equipments (UEs) 3820 located within the region of the eNB 3810.

The eNB 3810 includes a processor 3811, a memory 3812 and a radio frequency unit 3813. The processor 3811 implements the functions, processes and/or methods proposed in FIGS. 1 to 37 above. The layers of wireless interface protocol may be implemented by the processor 3811. The memory 3812 is connected to the processor 3811, and stores various types of information for driving the processor 3811. The RF unit 3813 is connected to the processor 3811, and transmits and/or receives radio signals.

The UE 3820 includes a processor 3821, a memory 3822 and an RF unit 3823. The processor 3821 implements the functions, processes and/or methods proposed in FIGS. 1 to 37 above. The layers of wireless interface protocol may be implemented by the processor 3821. The memory 3822 is connected to the processor 3821, and stores various types of information for driving the processor 3821. The RF unit 3823 is connected to the processor 3821, and transmits and/or receives radio signals.

The memories 3812 and 3822 may be located interior or exterior of the processors 3811 and 3821, and may be connected to the processors 3811 and 3821 with well known means.

In addition, the eNB 3810 and/or the UE 3820 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The method for transmitting uplink data in a wireless communication system of the present invention has been described mainly with the example applied to 3GPP LTE/LTE-A system, but may also be applied to various wireless communication systems except the 3GPP LTE/LTE-A system.

What is claimed is:

1. A method for transmitting, by a user equipment (UE), an uplink (UL) data in a wireless communication system, the method comprising:
   receiving a first UL grant from a base station (BS);
   transmitting, to the BS, a first UL data based on the first UL grant;
   receiving a hybrid automatic repeat request (HARD) response of the first UL data from the BS; and
   transmitting, to the B S, a second UL data;
   wherein the second UL data is a retransmission data of the first UL data or a new data,
   wherein the second UL data is transmitted according to a first CRC (Cyclic Redundancy Check) type or a second CRC type,
   wherein the first CRC type is used when the second UL data is the retransmission data,
   wherein the second CRC type is used when the second UL data is the new data, and
   wherein the first CRC type is a type based on a CRC24A or a CRC24B, and the second CRC type is a predefined type different from the first CRC type.

2. The method of claim 1, wherein the second UL data is transmitted with control information related to whether the second UL data is the retransmission data of the first UL data or the new data, and
   wherein the second UL data and the control information are included in MAC PDU (Medium Access Control Protocol Data Unit).

3. The method of claim 2, wherein the control information is a specific header of the MAC PDU.

4. The method of claim 3, wherein the specific header comprises a specific field which is information for whether New Data Indicator (NDI) field is included in the specific header.

5. The method of claim 4, wherein the specific header is located in forefront of the MAC PDU.

6. The method of claim 1, wherein the type of CRC is determined depending on whether a transport block (TB) of the retransmission data or the new data is segmented.

7. The method of claim 1, wherein the second UL data is transmitted with control information related to whether the second UL data is the retransmission data or the new data, and
   wherein the second UL data and the control information are multiplexed on a physical uplink shared channel (PUSCH) resource.

8. The method of claim 7, wherein the control information is mapped to a specific resource element (RE) of the PUSCH resource, and
   wherein a resource of the second UL data and a resource of the control information are not overlapped.

9. The method of claim 8, wherein the control information is mapped to at least one symbol of a lowest subcarrier index of the PUSCH resource or mapped to at least one symbol of a center sub carrier index of the PUSCH resource.

10. The method of claim 1, further comprising:
    receiving a downlink (DL) data from the BS; and
    transmitting a HARQ response of the received DL data and control information related to whether the second UL data is the retransmission data of the first UL data or the new data to the BS,
    wherein the control information is transmitted with being multiplexed with the HARQ response of the received DL data.

11. The method of claim 1, wherein the control information and the HARQ response of the received DL data are distinguished by an orthogonal sequence.

12. A method for receiving, by a base station (BS), an uplink (UL) data in a wireless communication system, the method comprising:
    transmitting a first UL grant to a user equipment (UE);
    receiving a first UL data from the UE;
    transmitting, to the UE, a hybrid automatic repeat request (HARQ) response of the first UL data; and
    receiving, from the UE, a second UL data,
    wherein the second UL data is a retransmission data of the first UL data or a new data,
    wherein the second UL data is transmitted according to a first CRC (Cyclic Redundancy Check) type or a second CRC type,
    wherein the first CRC type is used when the second UL data is the retransmission data,
    wherein the second CRC type is used when the second UL data is the new data, and
    wherein the first CRC type is a type based on a CRC24A or a CRC24B, and the second CRC type is a predefined type different from the first CRC type.

13. The method of claim 12, wherein the second UL data is received with the control information related to whether the second UL data is the retransmission data or the new data.

14. The method of claim 13, further comprising:
determining to perform HARQ combining between the first UL data and the second UL based on the control information.

15. The method of claim 14, wherein, when the second UL data is the retransmission data of the first UL data, the first UL data and the second UL data are HARQ combined, and
wherein, when the second UL data is the new data, the first UL data stored in a HARQ buffer is discarded or separately stored.

16. The method of claim 15, when the second UL data is the new data, further comprising:
transmitting, to the UE, HARQ NACK for a reception failure of the first UL data; and
receiving, from the UE, the retransmission data of the first UL data.

17. The method of claim 15, when the second UL data is the new data, further comprising:
transmitting, to the UE, HARQ NACK for a reception failure of the first UL data; and
receiving, from the UE, the second UL data.

18. The method of claim 17, further comprising:
transmitting, to the UE, a second UL grant for newly allocating a retransmission resource of the first UL data; and
receiving, from the UE, the retransmission data of the first UL data based on the second UL grant.

19. A user equipment (UE) for transmitting an uplink (UL) data in a wireless communication system, comprising:
a transceiver for transmitting and receiving a radio signal;
memory; and
a processor connected to the transceiver and the memory,
wherein the processor is configured to:
receive a first UL grant from a base station (BS);
transmit, to the BS, a first UL data based on the first UL grant;
receive a hybrid automatic repeat request (HARQ) response of the first UL data from the BS; and
transmit, to the BS, a second UL data,
wherein the second UL data is a retransmission data of the first UL data or a new data,
wherein the second UL data is transmitted according to a first CRC (Cyclic Redundancy Check) type or a second CRC type,
wherein the first CRC type is used when the second UL data is the retransmission data,
wherein the second CRC type is used when the second UL data is the new data, and
wherein the first CRC type is a type based on a CRC24A or a CRC24B, and the second CRC type is a predefined type different from the first CRC type.

* * * * *